(12) United States Patent
Young et al.

(10) Patent No.: US 9,995,486 B2
(45) Date of Patent: Jun. 12, 2018

(54) GAS VALVE WITH HIGH/LOW GAS PRESSURE DETECTION

(75) Inventors: Gregory Young, Richfield, MN (US); Donald J. Kasprzyk, Maple Grove, MN (US); David Kucera, Bilovice nad Svitavou (CZ)

(73) Assignee: Honeywell International Inc., Morris Plains, NJ (US)

( * ) Notice: Subject to any disclaimer, the term of this patent is extended or adjusted under 35 U.S.C. 154(b) by 1026 days.

(21) Appl. No.: 13/326,357

(22) Filed: Dec. 15, 2011

(65) Prior Publication Data

US 2013/0153042 A1 Jun. 20, 2013

(51) Int. Cl.
*G05D 7/06* (2006.01)
*G05D 16/20* (2006.01)
(Continued)

(52) U.S. Cl.
CPC .............. *F23N 1/005* (2013.01); *F17D 5/02* (2013.01); *G01M 3/2876* (2013.01);
(Continued)

(58) Field of Classification Search
CPC .............. G05D 7/0635; G05D 7/0647; G05D 16/2033; G01M 3/2876; F17D 5/02;
(Continued)

(56) References Cited

U.S. PATENT DOCUMENTS 156,769 A 11/1874 Cameron
424,581 A 4/1890 Sickels
(Continued)

FOREIGN PATENT DOCUMENTS

DE 3638604 5/1988
DE 3818363 A1 4/1989
(Continued)

OTHER PUBLICATIONS

"Flexible, Compact and with a High Performance—the New Valvario, G. Kromschroder AG Launches it's New, Improved Series of Gas Fittings," Press Release, 2 pages, 2003.
(Continued)

*Primary Examiner* — Mary McManmon
*Assistant Examiner* — Hailey K Do
(74) *Attorney, Agent, or Firm* — Seager, Tufte & Wickhem, LLP

(57) ABSTRACT

This disclosure relates generally to valves, and more particularly, to gas valve assemblies. In one example, the valve assembly may include a valve body with a fluid path, one or more valves or valve sealing members positioned across the fluid path, and one or more pressure sensors in fluid communication with a fluid path of the valve assembly. The valve assembly may include a valve controller in communication with the pressure sensors, where the valve controller may be configured to compare a measure related to a pressure sensed by the one or more pressure sensors to a pressure threshold value (e.g., a high pressure threshold value, a low pressure threshold value, or other pressure threshold value). If the measure surpasses the threshold value, the valve controller may provide a predetermined output signal indicating a pressure event has occurred, such as a high or low gas pressure event.

10 Claims, 17 Drawing Sheets

(51) Int. Cl.
  *G01M 3/28* (2006.01)
  *F17D 5/02* (2006.01)
  *F23N 1/00* (2006.01)

(52) U.S. Cl.
  CPC ....... *G05D 7/0635* (2013.01); *G05D 16/2033* (2013.01); *F23N 2025/04* (2013.01); *F23N 2035/14* (2013.01); *F23N 2035/16* (2013.01); *F23N 2035/18* (2013.01); *F23N 2035/24* (2013.01); *Y10T 137/0396* (2015.04); *Y10T 137/7761* (2015.04)

(58) Field of Classification Search
  CPC ............. F23N 2035/14; F23N 2035/16; F23N 2035/18; F23N 2035/24
  USPC .... 137/487.5, 486, 487, 613, 614, 883, 884, 137/163, 391, 461, 260, 266, 557, 8; 73/40.5 R, 40
  See application file for complete search history.

(56) References Cited

U.S. PATENT DOCUMENTS

| | | |
|---|---|---|
| 1,033,204 A | 7/1912 | Skinner |
| 1,147,840 A | 7/1915 | Bowser |
| 1,156,977 A | 10/1915 | Cloos |
| 1,165,315 A | 12/1915 | Cameron |
| 1,206,532 A | 11/1916 | Gray |
| 1,847,385 A | 3/1932 | Dengler |
| 2,093,122 A | 9/1937 | Andrews |
| 2,196,798 A | 4/1940 | Horstmann |
| 2,403,692 A | 7/1946 | Tibbetts |
| 2,791,238 A | 5/1957 | Bryant |
| 2,975,307 A | 3/1961 | Schroeder et al. |
| 3,164,364 A | 1/1965 | McColl |
| 3,202,170 A | 8/1965 | Holbrook |
| 3,304,406 A | 2/1967 | King |
| 3,346,008 A | 10/1967 | Scaramucci |
| 3,381,623 A | 5/1968 | Elliott |
| 3,393,965 A | 7/1968 | Vaughan |
| 3,414,010 A | 12/1968 | Sparrow |
| 3,493,005 A | 2/1970 | Kakegawa |
| 3,641,373 A | 2/1972 | Elkuch |
| 3,646,969 A | 3/1972 | Stampfli |
| 3,744,754 A | 7/1973 | Demi |
| 3,768,955 A | 10/1973 | McLaughlin |
| 3,769,531 A | 10/1973 | Elkuch |
| 3,803,424 A | 4/1974 | Smiley et al. |
| 3,884,266 A | 5/1975 | Kondo |
| 3,947,644 A | 3/1976 | Uchikawa |
| 3,960,364 A | 6/1976 | Hargrave |
| 3,973,576 A | 8/1976 | Dietiker |
| 3,973,976 A | 8/1976 | Boyd |
| 3,993,939 A | 11/1976 | Slavin et al. |
| 4,114,652 A | 9/1978 | Oberle |
| 4,115,036 A | 9/1978 | Paterson |
| 4,140,936 A | 2/1979 | Bullock |
| 4,188,013 A | 2/1980 | Battersby et al. |
| 4,188,972 A | 2/1980 | Van Der Zee |
| 4,197,737 A | 4/1980 | Pittman |
| 4,242,080 A | 12/1980 | Tabei |
| 4,277,832 A | 7/1981 | Wong |
| 4,360,955 A | 11/1982 | Block |
| 4,402,340 A | 9/1983 | Lockwood, Jr. |
| 4,406,131 A | 9/1983 | Weasel, Jr. |
| 4,418,886 A | 12/1983 | Holzer |
| 4,442,853 A | 4/1984 | Gort |
| 4,450,868 A | 5/1984 | Duval et al. |
| 4,453,169 A | 6/1984 | Martner |
| 4,478,076 A | 10/1984 | Bohrer |
| 4,478,077 A | 10/1984 | Bohrer et al. |
| 4,481,776 A | 11/1984 | Araki et al. |
| 4,493,303 A | 1/1985 | Thompson et al. |
| 4,498,850 A | 2/1985 | Perlov et al. |
| 4,501,144 A | 2/1985 | Higashi et al. |
| 4,539,575 A | 9/1985 | Nilsson |
| 4,543,974 A | 10/1985 | Dietiker et al. |
| 4,576,050 A | 3/1986 | Lambert |
| 4,581,624 A | 4/1986 | O'Connor |
| 4,581,707 A | 4/1986 | Millar |
| 4,585,209 A | 4/1986 | Aine et al. |
| 4,619,438 A | 10/1986 | Coffee |
| 4,622,699 A | 11/1986 | Spriggs |
| 4,628,499 A | 12/1986 | Hammett |
| 4,645,450 A | 2/1987 | West |
| 4,651,564 A | 3/1987 | Johnson et al. |
| 4,654,546 A | 3/1987 | Kirjavainen |
| 4,698,015 A | 10/1987 | Brunel |
| 4,722,360 A | 2/1988 | Odajima et al. |
| 4,756,508 A | 7/1988 | Giachino et al. |
| 4,815,699 A | 3/1989 | Mueller |
| 4,821,999 A | 4/1989 | Ohtaka |
| 4,829,826 A | 5/1989 | Valentin et al. |
| 4,835,717 A | 5/1989 | Michel et al. |
| 4,836,247 A | 6/1989 | Chuang |
| 4,898,200 A | 2/1990 | Odajima et al. |
| 4,911,616 A | 3/1990 | Laumann, Jr. |
| 4,915,613 A * | 4/1990 | Landis et al. ................ 431/6 |
| 4,938,742 A | 7/1990 | Smits |
| 4,939,405 A | 7/1990 | Okuyama et al. |
| 5,022,435 A | 6/1991 | Jaw-Shiunn |
| 5,057,822 A | 10/1991 | Hoffman |
| 5,065,978 A | 11/1991 | Albarda et al. |
| 5,069,419 A | 12/1991 | Jerman |
| 5,070,252 A | 12/1991 | Castenschiold et al. |
| 5,078,581 A | 1/1992 | Blum et al. |
| 5,082,242 A | 1/1992 | Bonne et al. |
| 5,082,246 A | 1/1992 | Stanley et al. |
| 5,085,562 A | 2/1992 | Van Lintel |
| 5,096,388 A | 3/1992 | Weinberg |
| 5,129,794 A | 7/1992 | Beatty |
| 5,146,941 A | 9/1992 | Statler |
| 5,148,074 A | 9/1992 | Fujita et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,190,068 A | 3/1993 | Philbin |
| 5,192,197 A | 3/1993 | Culp |
| 5,193,993 A | 3/1993 | Dietiker |
| 5,199,456 A | 4/1993 | Love et al. |
| 5,199,462 A | 4/1993 | Baker |
| 5,203,688 A | 4/1993 | Dietiker |
| 5,205,323 A | 4/1993 | Baker |
| 5,206,557 A | 4/1993 | Bobbio |
| 5,215,112 A | 6/1993 | Davison |
| 5,215,115 A | 6/1993 | Dietiker |
| 5,219,278 A | 6/1993 | Van Lintel |
| 5,224,843 A | 7/1993 | Van Lintel |
| 5,244,527 A | 9/1993 | Aoyagi |
| 5,244,537 A | 9/1993 | Ohnstein |
| 5,263,514 A | 11/1993 | Reeves |
| 5,294,089 A | 3/1994 | LaMarca |
| 5,322,258 A | 6/1994 | Bosch et al. |
| 5,323,999 A | 6/1994 | Bonne |
| 5,325,880 A | 7/1994 | Johnson et al. |
| 5,336,062 A | 8/1994 | Richter |
| 5,368,571 A | 11/1994 | Horres, Jr. |
| 5,388,607 A | 2/1995 | Ramaker et al. |
| 5,441,597 A | 8/1995 | Bonne et al. |
| 5,449,142 A | 9/1995 | Banick |
| 5,452,878 A | 9/1995 | Gravesen et al. |
| 5,460,196 A | 10/1995 | Yonnet |
| 5,477,877 A | 12/1995 | Schulze et al. |
| 5,499,909 A | 3/1996 | Yamada et al. |
| 5,513,611 A | 5/1996 | Ricouard et al. |
| 5,520,533 A | 5/1996 | Vrolijk |
| 5,526,172 A | 6/1996 | Kanack |
| 5,529,465 A | 6/1996 | Zengerle et al. |
| 5,536,963 A | 7/1996 | Polla |
| 5,538,220 A | 7/1996 | LaMarca |
| 5,541,465 A | 7/1996 | Higuchi et al. |
| 5,552,654 A | 9/1996 | Konno et al. |

(56) References Cited

U.S. PATENT DOCUMENTS

| | | |
|---|---|---|
| 5,565,832 A | 10/1996 | Haller et al. |
| 5,571,401 A | 11/1996 | Lewis et al. |
| 5,580,444 A | 12/1996 | Burrows |
| 5,590,235 A | 12/1996 | Rappenecker et al. |
| 5,621,164 A | 4/1997 | Woodbury et al. |
| 5,642,015 A | 6/1997 | Whitehead et al. |
| 5,676,342 A | 10/1997 | Otto et al. |
| 5,683,159 A | 11/1997 | Johnson |
| 5,685,707 A | 11/1997 | Ramsdell et al. |
| 5,696,662 A | 12/1997 | Bauhahn |
| 5,725,363 A | 3/1998 | Bustgens et al. |
| 5,735,503 A | 4/1998 | Hietkamp |
| 5,741,978 A | 4/1998 | Gudmundsson |
| 5,748,432 A | 5/1998 | Przywozny et al. |
| 5,755,259 A | 5/1998 | Schulze et al. |
| 5,759,014 A | 6/1998 | Van Lintel |
| 5,759,015 A | 6/1998 | Van Lintel et al. |
| 5,769,043 A | 6/1998 | Nitkiewicz |
| 5,774,372 A | 6/1998 | Berwanger |
| 5,790,420 A | 8/1998 | Lang |
| 5,792,957 A | 8/1998 | Luder et al. |
| 5,797,358 A | 8/1998 | Brandt et al. |
| 5,808,205 A | 9/1998 | Romo |
| 5,822,170 A | 10/1998 | Cabuz et al. |
| 5,827,950 A | 10/1998 | Woodbury et al. |
| 5,836,750 A | 11/1998 | Cabuz |
| 5,839,467 A | 11/1998 | Saaski et al. |
| 5,847,523 A | 12/1998 | Rappenecker et al. |
| 5,863,708 A | 1/1999 | Zanzucchi et al. |
| 5,887,847 A | 3/1999 | Holborow |
| 5,893,389 A | 4/1999 | Cunningham |
| 5,901,939 A | 5/1999 | Cabuz et al. |
| 5,911,872 A | 6/1999 | Lewis et al. |
| 5,918,852 A | 7/1999 | Otto |
| 5,933,573 A | 8/1999 | Lukenich et al. |
| 5,944,257 A | 8/1999 | Dietiker et al. |
| 5,954,079 A | 9/1999 | Barth et al. |
| 5,954,089 A | 9/1999 | Seymour |
| 5,957,158 A | 9/1999 | Volz et al. |
| 5,959,448 A | 9/1999 | Baranski et al. |
| 5,967,124 A | 10/1999 | Cook et al. |
| 5,971,355 A | 10/1999 | Biegelsen et al. |
| 5,982,274 A | 11/1999 | Stetler et al. |
| 5,986,573 A | 11/1999 | Franklin et al. |
| 6,003,552 A | 12/1999 | Shank et al. |
| 6,021,652 A | 2/2000 | Walker |
| 6,050,281 A | 4/2000 | Adams et al. |
| 6,057,771 A | 5/2000 | Lakra |
| 6,077,068 A | 6/2000 | Okumura |
| 6,106,245 A | 8/2000 | Cabuz |
| 6,109,889 A | 8/2000 | Zengerle et al. |
| 6,116,863 A | 9/2000 | Ahn et al. |
| 6,122,973 A | 9/2000 | Nomura et al. |
| 6,151,967 A | 11/2000 | McIntosh et al. |
| 6,152,168 A | 11/2000 | Ohmi et al. |
| 6,155,531 A | 12/2000 | Holborow et al. |
| 6,167,761 B1 | 1/2001 | Hanzawa et al. |
| 6,176,247 B1 | 1/2001 | Winchcomb et al. |
| 6,179,000 B1 | 1/2001 | Zdobinski et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,189,568 B1 | 2/2001 | Bergum et al. |
| 6,213,758 B1 | 4/2001 | Tesar et al. |
| 6,215,221 B1 | 4/2001 | Cabuz et al. |
| 6,240,944 B1 | 6/2001 | Ohnstein et al. |
| 6,242,909 B1 | 6/2001 | Dorsey et al. |
| 6,247,919 B1 | 6/2001 | Welz, Jr. et al. |
| 6,255,609 B1 | 7/2001 | Samuelson et al. |
| 6,263,908 B1 | 7/2001 | Love et al. |
| 6,288,472 B1 | 9/2001 | Cabuz et al. |
| 6,297,640 B1 | 10/2001 | Hayes |
| 6,321,781 B1 | 11/2001 | Kurth |
| 6,360,773 B1 | 3/2002 | Rhodes |
| 6,373,682 B1 | 4/2002 | Goodwin-Johansson |
| 6,386,234 B2 | 5/2002 | Sontag |
| 6,390,027 B1 | 5/2002 | Lyons et al. |
| 6,397,798 B1 | 6/2002 | Fiaccabrino |
| 6,401,753 B2 | 6/2002 | Neu |
| 6,418,793 B1 | 7/2002 | Pechoux et al. |
| 6,445,053 B1 | 9/2002 | Cho |
| 6,450,200 B1 | 9/2002 | Ollivier |
| 6,460,567 B1 | 10/2002 | Hansen, III et al. |
| 6,463,546 B1 | 10/2002 | Jeske et al. |
| 6,496,348 B2 | 12/2002 | McIntosh |
| 6,496,786 B1 | 12/2002 | Dieterle et al. |
| 6,505,838 B1 | 1/2003 | Cavaliere |
| 6,508,528 B2 | 1/2003 | Fujii et al. |
| 6,520,753 B1 | 2/2003 | Grosjean et al. |
| 6,533,574 B1 | 3/2003 | Pechoux |
| 6,536,287 B2 | 3/2003 | Beekhuizen et al. |
| 6,537,060 B2 | 3/2003 | Vegter |
| 6,547,554 B2 | 4/2003 | Koegl et al. |
| 6,550,495 B1 | 4/2003 | Schulze |
| 6,553,979 B2 | 4/2003 | Albright |
| 6,561,791 B1 | 5/2003 | Vrolijk et al. |
| 6,563,233 B1 | 5/2003 | Hinks |
| 6,564,824 B2 | 5/2003 | Lowery et al. |
| 6,571,817 B1 | 6/2003 | Bohan, Jr. |
| 6,572,077 B1 | 6/2003 | Womer |
| 6,579,087 B1 | 6/2003 | Vrolijk |
| 6,584,852 B2 | 7/2003 | Suzuki et al. |
| 6,590,267 B1 | 7/2003 | Goodwin-Johansson et al. |
| 6,606,911 B2 | 8/2003 | Akiyama et al. |
| 6,619,388 B2 | 9/2003 | Dietz et al. |
| 6,619,612 B2 | 9/2003 | Freisinger et al. |
| 6,623,012 B1 | 9/2003 | Perry et al. |
| 6,640,642 B1 | 11/2003 | Onose et al. |
| 6,644,351 B2 | 11/2003 | LaMarca et al. |
| 6,650,211 B2 | 11/2003 | Pimouguet |
| 6,651,506 B2 | 11/2003 | Lee et al. |
| 6,651,636 B1 | 11/2003 | Albright |
| 6,651,954 B1 | 11/2003 | Porcher et al. |
| 6,655,409 B1 | 12/2003 | Steenburgh et al. |
| 6,655,652 B2 | 12/2003 | Meinhof |
| 6,658,928 B1 | 12/2003 | Pollack et al. |
| 6,676,580 B2 | 1/2004 | Tsai et al. |
| 6,704,186 B2 | 3/2004 | Ishikura |
| 6,725,167 B2 | 4/2004 | Grumstrup et al. |
| 6,728,600 B1 | 4/2004 | Contaldo et al. |
| 6,729,601 B2 | 5/2004 | Freisinger et al. |
| 6,742,541 B2 | 6/2004 | Pimouguet |
| 6,768,406 B1 | 7/2004 | Fiaccabrino |
| 6,796,326 B2 | 9/2004 | Bayer |
| 6,813,954 B2 | 11/2004 | Gokhfeld |
| 6,814,102 B2 | 11/2004 | Hess et al. |
| 6,814,339 B2 | 11/2004 | Berger et al. |
| 6,819,208 B1 | 11/2004 | Peghaire et al. |
| 6,820,650 B2 | 11/2004 | Solet et al. |
| 6,825,632 B2 | 11/2004 | Hahn et al. |
| 6,826,947 B2 | 12/2004 | Solet et al. |
| 6,851,298 B2 | 2/2005 | Miura et al. |
| 6,874,367 B2 | 4/2005 | Jakobsen |
| 6,877,380 B2 | 4/2005 | Lewis |
| 6,877,383 B2 | 4/2005 | Horie et al. |
| 6,880,548 B2 | 4/2005 | Schultz et al. |
| 6,880,567 B2 | 4/2005 | Klaver et al. |
| 6,885,184 B1 | 4/2005 | Gofman |
| 6,888,354 B1 | 5/2005 | Gofman |
| 6,889,705 B2 | 5/2005 | Newman et al. |
| 6,892,756 B2 | 5/2005 | Schulze |
| 6,906,484 B1 | 6/2005 | Berroth et al. |
| 6,918,756 B2 | 7/2005 | Fredricks et al. |
| 6,923,069 B1 | 8/2005 | Stewart |
| 6,956,340 B2 | 10/2005 | Schondelmaier et al. |
| 6,956,343 B2 | 10/2005 | Berroth et al. |
| 6,968,851 B2 | 11/2005 | Ramirez et al. |
| 6,981,426 B2 | 1/2006 | Wang et al. |
| 6,983,759 B2 | 1/2006 | Maichel et al. |
| 6,984,122 B2 | 1/2006 | Sullivan et al. |
| 6,994,308 B1 | 2/2006 | Wang et al. |
| 6,997,684 B2 | 2/2006 | Hahn et al. |
| 7,000,635 B2 | 2/2006 | Erbe et al. |
| 7,004,034 B2 | 2/2006 | Chen |

(56) References Cited

U.S. PATENT DOCUMENTS

| | | | |
|---|---|---|---|
| 7,039,502 B2 | 5/2006 | Berwanger et al. |
| 7,048,536 B2 | 5/2006 | Sullivan et al. |
| 7,066,203 B2 | 6/2006 | Baarda |
| 7,082,835 B2 | 8/2006 | Cook et al. |
| 7,089,086 B2 | 8/2006 | Schoonover |
| 7,089,959 B2 | 8/2006 | Cai |
| 7,093,611 B2 | 8/2006 | Murray et al. |
| 7,101,172 B2 | 9/2006 | Jaeschke |
| 7,107,820 B2 | 9/2006 | Nunnally et al. |
| 7,119,504 B2 | 10/2006 | Dornhof |
| 7,121,525 B2 | 10/2006 | Gelez |
| 7,174,771 B2 | 2/2007 | Cooper |
| 7,216,547 B1 | 5/2007 | Stewart et al. |
| 7,223,094 B2 | 5/2007 | Goebel |
| 7,225,056 B2 | 5/2007 | Bolduan et al. |
| 7,249,610 B2 | 7/2007 | Moses |
| 7,260,994 B2 | 8/2007 | Oboodi et al. |
| 7,290,502 B2 | 11/2007 | Kidd et al. |
| 7,297,640 B2 | 11/2007 | Xie et al. |
| 7,302,863 B2 | 12/2007 | Kielb et al. |
| 7,319,300 B2 | 1/2008 | Hahn |
| 7,328,719 B2 | 2/2008 | Madden |
| 7,347,221 B2 | 3/2008 | Berger et al. |
| 7,360,751 B2 | 4/2008 | Herrfurth |
| 7,390,172 B2 | 6/2008 | Winkler |
| 7,398,796 B2 * | 7/2008 | Hjorth | F15B 13/0867 137/552 |
| 7,402,038 B2 | 7/2008 | Neville et al. |
| 7,402,925 B2 | 7/2008 | Best et al. |
| 7,405,609 B2 | 7/2008 | Krotsch |
| 7,422,028 B2 | 9/2008 | Nugent et al. |
| 7,451,600 B2 | 11/2008 | Patel et al. |
| 7,451,644 B2 | 11/2008 | Karte |
| 7,453,696 B2 | 11/2008 | Tungl et al. |
| 7,461,828 B2 | 12/2008 | Kidprasert |
| 7,493,822 B2 | 2/2009 | Stewart et al. |
| 7,503,221 B2 | 3/2009 | Wade |
| 7,504,961 B2 | 3/2009 | Flanders |
| 7,520,487 B2 | 4/2009 | Mattes |
| 7,537,019 B2 * | 5/2009 | Ting et al. | 137/14 |
| 7,543,604 B2 | 6/2009 | Benda |
| 7,553,151 B2 | 6/2009 | O'Mara et al. |
| 7,556,238 B2 | 7/2009 | Seberger |
| 7,574,896 B1 | 8/2009 | Cooper |
| 7,586,228 B2 | 9/2009 | Best |
| 7,586,276 B2 | 9/2009 | Dornhoff |
| 7,624,755 B2 | 12/2009 | Benda et al. |
| 7,627,455 B2 | 12/2009 | Lenz et al. |
| 7,644,731 B2 | 1/2010 | Benda et al. |
| 7,647,940 B2 | 1/2010 | Minervini et al. |
| 7,669,461 B2 | 3/2010 | Kates |
| 7,688,011 B2 | 3/2010 | Berroth et al. |
| 7,715,168 B2 | 5/2010 | Gofman et al. |
| 7,735,509 B2 | 6/2010 | Galloway et al. |
| 7,740,024 B2 | 6/2010 | Brodeur et al. |
| 7,759,884 B2 | 7/2010 | Dufner et al. |
| 7,811,069 B2 | 10/2010 | Fleig |
| 7,812,488 B2 | 10/2010 | Cosco et al. |
| 7,816,813 B2 | 10/2010 | Yagudayev et al. |
| 7,841,541 B2 | 11/2010 | Ardelt et al. |
| 7,869,971 B2 | 1/2011 | Varga |
| 7,880,421 B2 | 2/2011 | Karwath |
| 7,880,427 B2 | 2/2011 | Foll et al. |
| 7,890,216 B2 | 2/2011 | Boger et al. |
| 7,890,276 B2 | 2/2011 | Killion et al. |
| 7,891,972 B2 | 2/2011 | Blank et al. |
| 7,898,372 B2 | 3/2011 | Melchionne, Jr. |
| 7,902,776 B2 | 3/2011 | Karwath |
| 7,905,251 B2 | 3/2011 | Flanders |
| 7,922,481 B2 | 4/2011 | Geiger et al. |
| 7,940,189 B2 | 5/2011 | Brown |
| 8,020,585 B2 | 9/2011 | Shock et al. |
| 8,036,837 B2 | 10/2011 | Wilke |
| 8,066,255 B2 | 11/2011 | Wang |
| 8,109,289 B2 | 2/2012 | Trnka et al. |
| 8,126,631 B2 | 2/2012 | Scalia, Jr. |
| 8,201,572 B2 | 6/2012 | Segal |
| 8,205,484 B2 | 6/2012 | Sasaki |
| 8,225,814 B2 | 7/2012 | Igarashi |
| 8,240,636 B2 | 8/2012 | Smith |
| 8,265,794 B2 | 9/2012 | Minervini et al. |
| 8,271,141 B2 | 9/2012 | Cummings et al. |
| 8,303,297 B2 | 11/2012 | Tompkins |
| 8,307,845 B2 | 11/2012 | Kouchi et al. |
| 8,381,760 B2 | 2/2013 | Santinanavat et al. |
| 8,387,441 B2 | 3/2013 | Falta et al. |
| 8,424,563 B2 | 4/2013 | Haller et al. |
| 8,639,464 B2 | 1/2014 | Artiuch et al. |
| 8,677,913 B2 | 3/2014 | Kastingschafer et al. |
| 8,961,169 B2 | 2/2015 | Newby et al. |
| 2002/0029808 A1 | 3/2002 | Friend et al. |
| 2002/0157713 A1 | 10/2002 | Pimouguet |
| 2002/0175791 A1 | 11/2002 | LaMarca et al. |
| 2003/0011136 A1 | 1/2003 | Ramirez et al. |
| 2003/0117098 A1 | 6/2003 | Berroth et al. |
| 2003/0150499 A1 | 8/2003 | Solet et al. |
| 2003/0167851 A1 | 9/2003 | Parker |
| 2003/0201414 A1 | 10/2003 | Freisinger et al. |
| 2004/0035211 A1 | 2/2004 | Pinto et al. |
| 2004/0129909 A1 | 7/2004 | Wiese |
| 2004/0217182 A1 * | 11/2004 | St. Jean | F23Q 7/24 237/2 A |
| 2004/0263103 A1 | 12/2004 | Weisser et al. |
| 2005/0058961 A1 | 3/2005 | Moses |
| 2005/0166979 A1 | 8/2005 | Berger et al. |
| 2005/0199286 A1 * | 9/2005 | Appleford et al. | 137/487.5 |
| 2005/0255418 A1 | 11/2005 | Goebel |
| 2005/0279956 A1 | 12/2005 | Berger et al. |
| 2006/0202572 A1 | 9/2006 | Tungl et al. |
| 2006/0226299 A1 | 10/2006 | Tungl et al. |
| 2006/0228237 A1 | 10/2006 | Winkler |
| 2006/0243334 A1 | 11/2006 | Brochhaus et al. |
| 2006/0260701 A1 | 11/2006 | Mattes |
| 2006/0272712 A1 | 12/2006 | Sontag |
| 2006/0278281 A1 | 12/2006 | Gynz-Rekowski et al. |
| 2007/0024225 A1 | 2/2007 | Hahn |
| 2007/0068511 A1 | 3/2007 | Bachinkski et al. |
| 2007/0089789 A1 | 4/2007 | Mudd et al. |
| 2007/0095144 A1 | 5/2007 | Oboodi et al. |
| 2007/0164243 A1 | 7/2007 | Volz |
| 2007/0189739 A1 | 8/2007 | Dufner et al. |
| 2007/0241705 A1 | 10/2007 | Karwath |
| 2007/0256478 A1 | 11/2007 | Guadagnoia et al. |
| 2007/0257628 A1 | 11/2007 | Gofman et al. |
| 2008/0035456 A1 | 2/2008 | Melchionn, Jr. |
| 2008/0099082 A1 | 5/2008 | Moenkhaus |
| 2008/0156077 A1 | 7/2008 | Flanders |
| 2008/0157707 A1 | 7/2008 | Jeske et al. |
| 2008/0297084 A1 | 12/2008 | Berroth et al. |
| 2008/0315807 A1 | 12/2008 | Loffler et al. |
| 2008/0318098 A1 | 12/2008 | Matsunaga |
| 2008/0318172 A1 | 12/2008 | Geiger et al. |
| 2009/0068503 A1 | 3/2009 | Yamazaki et al. |
| 2009/0120338 A1 | 5/2009 | Adendorf et al. |
| 2009/0126798 A1 | 5/2009 | Mather |
| 2009/0142717 A1 | 6/2009 | Lavelle |
| 2009/0146091 A1 | 6/2009 | Ams et al. |
| 2009/0148798 A1 | 6/2009 | Geiger et al. |
| 2009/0197212 A1 | 8/2009 | Masen |
| 2009/0240445 A1 | 9/2009 | Umekage et al. |
| 2009/0280989 A1 | 11/2009 | Astra et al. |
| 2009/0288399 A1 | 11/2009 | Fayard |
| 2009/0303076 A1 * | 12/2009 | Setiadi | H04Q 9/00 340/870.01 |
| 2010/0018324 A1 | 1/2010 | Killian et al. |
| 2010/0043896 A1 | 2/2010 | Shock et al. |
| 2010/0064818 A1 | 3/2010 | Shubert |
| 2010/0074777 A1 | 3/2010 | Laufer et al. |
| 2010/0102259 A1 | 4/2010 | Forster |
| 2010/0112500 A1 | 5/2010 | Maiello et al. |
| 2010/0146939 A1 | 6/2010 | Sim et al. |
| 2010/0180688 A1 | 7/2010 | Khemet et al. |
| 2010/0180882 A1 | 7/2010 | Oberhomburg et al. |
| 2010/0193045 A1 | 8/2010 | Xu |

(56) References Cited

U.S. PATENT DOCUMENTS

| | | |
|---|---|---|
| 2010/0254826 A1 | 10/2010 | Streng et al. |
| 2010/0269931 A1 | 10/2010 | Seebauer |
| 2010/0282988 A1 | 11/2010 | Kasprzyk et al. |
| 2010/0315027 A1 | 12/2010 | Wystup et al. |
| 2011/0025237 A1 | 2/2011 | Wystup et al. |
| 2011/0033808 A1 | 2/2011 | Geiger et al. |
| 2011/0039217 A1 | 2/2011 | Happe |
| 2011/0041483 A1 | 2/2011 | Kapparos |
| 2011/0046903 A1 | 2/2011 | Franklin |
| 2011/0080072 A1 | 4/2011 | Strobel et al. |
| 2011/0137579 A1 | 6/2011 | Seebauer |
| 2011/0240157 A1 | 10/2011 | Jones et al. |
| 2011/0266473 A1 | 11/2011 | Santinanavat et al. |
| 2011/0270544 A1 | 11/2011 | Kucera et al. |
| 2011/0284777 A1 | 11/2011 | Pitchford et al. |
| 2012/0107753 A1 | 5/2012 | Kemp |
| 2013/0153035 A1 | 6/2013 | Young et al. |
| 2014/0096850 A1 | 4/2014 | Filkovski et al. |
| 2015/0045971 A1 | 2/2015 | Endel et al. |

FOREIGN PATENT DOCUMENTS

| | | |
|---|---|---|
| DE | 19617852 | 10/1997 |
| DE | 19824521 | 12/1999 |
| DE | 102005033611 | 10/2006 |
| EP | 0062854 A1 | 10/1982 |
| EP | 0068517 B1 | 1/1986 |
| EP | 0275439 | 7/1988 |
| EP | 0282758 | 9/1988 |
| EP | 0356690 | 5/1993 |
| EP | 0563787 | 10/1993 |
| EP | 0617234 | 9/1994 |
| EP | 0522479 | 5/1996 |
| EP | 0744821 | 11/1996 |
| EP | 0645562 | 12/1996 |
| EP | 0678178 | 12/1996 |
| EP | 0664422 | 4/1997 |
| EP | 0665396 | 1/1998 |
| EP | 0822376 | 2/1998 |
| EP | 0817931 | 12/1998 |
| EP | 0652501 | 3/1999 |
| EP | 0907052 | 4/1999 |
| EP | 0817934 | 5/1999 |
| EP | 0896192 | 10/1999 |
| EP | 0952357 | 10/1999 |
| EP | 0757200 | 4/2000 |
| EP | 1031792 | 8/2000 |
| EP | 1069357 | 1/2001 |
| EP | 0896191 | 2/2001 |
| EP | 1084358 | 3/2001 |
| EP | 0881435 | 9/2001 |
| EP | 1186779 | 3/2002 |
| EP | 0976957 | 4/2002 |
| EP | 1157205 | 9/2002 |
| EP | 1121511 | 4/2003 |
| EP | 0992658 | 5/2003 |
| EP | 1323966 | 7/2003 |
| EP | 1078187 | 8/2003 |
| EP | 1084357 | 8/2003 |
| EP | 1382907 | 1/2004 |
| EP | 1403885 | 3/2004 |
| EP | 1413045 | 4/2004 |
| EP | 1424708 | 6/2004 |
| EP | 1176317 | 8/2004 |
| EP | 1269054 | 8/2004 |
| EP | 1484509 | 12/2004 |
| EP | 1073192 | 1/2005 |
| EP | 1191676 | 1/2005 |
| EP | 1275039 | 1/2005 |
| EP | 1499008 | 1/2005 |
| EP | 1446607 | 3/2005 |
| EP | 1510756 | 3/2005 |
| EP | 1299665 | 4/2005 |
| EP | 1324496 | 6/2005 |
| EP | 1535388 | 6/2005 |
| EP | 0751350 B1 | 9/2005 |
| EP | 1584870 | 10/2005 |
| EP | 1243857 | 12/2005 |
| EP | 1282798 | 12/2005 |
| EP | 0843287 | 2/2006 |
| EP | 1346463 | 3/2006 |
| EP | 1659462 | 5/2006 |
| EP | 1703140 | 9/2006 |
| EP | 1703146 | 9/2006 |
| EP | 1183772 | 10/2006 |
| EP | 1303718 | 10/2006 |
| EP | 1314240 | 10/2006 |
| EP | 1256763 | 11/2006 |
| EP | 1727268 | 11/2006 |
| EP | 1559936 | 12/2006 |
| EP | 1748534 | 1/2007 |
| EP | 1748545 | 1/2007 |
| EP | 1327808 | 2/2007 |
| EP | 1329659 | 2/2007 |
| EP | 1291532 | 6/2007 |
| EP | 1610046 | 6/2007 |
| EP | 1592905 | 7/2007 |
| EP | 1610045 | 7/2007 |
| EP | 1727261 | 10/2007 |
| EP | 1860328 | 11/2007 |
| EP | 1882882 | 1/2008 |
| EP | 1626321 | 2/2008 |
| EP | 1848907 | 4/2008 |
| EP | 1936778 | 6/2008 |
| EP | 1536169 | 11/2008 |
| EP | 1298679 | 12/2008 |
| EP | 1714040 | 12/2008 |
| EP | 2014979 | 1/2009 |
| EP | 1669648 | 2/2009 |
| EP | 2048439 | 4/2009 |
| EP | 2107248 | 7/2009 |
| EP | 2093545 | 8/2009 |
| EP | 1715229 | 10/2009 |
| EP | 2116857 | 11/2009 |
| EP | 2119946 | 11/2009 |
| EP | 1370787 | 3/2010 |
| EP | 1413044 | 3/2010 |
| EP | 2164164 | 3/2010 |
| EP | 2177796 | 4/2010 |
| EP | 2178201 | 4/2010 |
| EP | 1970610 | 5/2010 |
| EP | 2197101 | 6/2010 |
| EP | 2068056 | 8/2010 |
| EP | 2212984 | 8/2010 |
| EP | 1712800 | 10/2010 |
| EP | 2118493 | 10/2010 |
| EP | 2242344 | 10/2010 |
| EP | 1715582 | 11/2010 |
| EP | 1675757 | 12/2010 |
| EP | 2267883 | 12/2010 |
| EP | 1703139 | 1/2011 |
| EP | 2286976 | 2/2011 |
| EP | 1596495 | 4/2011 |
| EP | 2306622 | 4/2011 |
| EP | 2010500 | 6/2011 |
| EP | 2113696 | 7/2011 |
| EP | 2604924 B1 | 5/2015 |
| GB | 2099158 | 12/1982 |
| GB | 2327750 | 2/1999 |
| JP | 02-086258 | 3/1990 |
| JP | 05-219760 | 8/1993 |
| JP | 9061284 | 3/1997 |
| JP | 9184600 | 7/1997 |
| JP | 2004125809 | 4/2004 |
| JP | 2004309159 | 11/2004 |
| JP | 2008135922 | 6/2008 |
| JP | 2008286478 | 11/2008 |
| SU | 744877 | 6/1980 |
| WO | WO 87/05375 | 9/1987 |
| WO | WO 96/27095 | 9/1996 |
| WO | WO 97/29538 | 8/1997 |
| WO | 9801709 A2 | 1/1998 |
| WO | WO 99/24758 | 5/1999 |
| WO | WO 99/60292 | 11/1999 |

(56) References Cited

FOREIGN PATENT DOCUMENTS

| WO | WO 99/64769 | 12/1999 |
|----|-------------|---------|
| WO | WO 99/64770 | 12/1999 |
| WO | WO 00/28215 | 5/2000 |
| WO | WO 01/06179 | 1/2001 |
| WO | WO 01/33078 | 5/2001 |
| WO | WO 01/61226 | 8/2001 |
| WO | WO 01/73297 | 10/2001 |
| WO | WO 01/90617 | 11/2001 |
| WO | WO 02/04852 | 1/2002 |
| WO | WO 02/077502 | 10/2002 |
| WO | WO 02/084156 | 10/2002 |
| WO | WO 02/086365 | 10/2002 |
| WO | WO 02/086918 | 10/2002 |
| WO | WO 02/097840 | 12/2002 |
| WO | WO 2004/059830 | 7/2004 |
| WO | WO 2004/070245 | 8/2004 |
| WO | WO 2005/042313 | 3/2005 |
| WO | WO 2005/076455 | 8/2005 |
| WO | WO 2005/076456 | 8/2005 |
| WO | WO 2005/085652 | 9/2005 |
| WO | WO 2005/094150 | 10/2005 |
| WO | WO 2006/000366 | 1/2006 |
| WO | WO 2006/000367 | 1/2006 |
| WO | WO 2006/053816 | 3/2006 |
| WO | WO 2006/039956 | 4/2006 |
| WO | WO 2006/042635 | 4/2006 |
| WO | WO 2006/077069 | 7/2006 |
| WO | WO 2006/088367 | 8/2006 |
| WO | 2007018876 A1 | 2/2007 |
| WO | WO 2007/012419 | 2/2007 |
| WO | WO 2007/093312 | 8/2007 |
| WO | WO 2007/140927 | 12/2007 |
| WO | WO 2008/061575 | 3/2008 |
| WO | WO 2008/039061 | 4/2008 |
| WO | WO 2008/119404 | 10/2008 |
| WO | WO 2008/141911 | 11/2008 |
| WO | WO 2008/148401 | 12/2008 |
| WO | WO 2009/000481 | 12/2008 |
| WO | WO 2009/049694 | 4/2009 |
| WO | WO 2009/065815 | 5/2009 |
| WO | WO 2009/073510 | 6/2009 |
| WO | WO 2009/089857 | 7/2009 |
| WO | WO 2009/126020 | 10/2009 |
| WO | WO 2010/018192 | 2/2010 |
| WO | WO 2010/052137 | 5/2010 |
| WO | WO 2010/056111 | 5/2010 |
| WO | WO 2010/083877 | 7/2010 |
| WO | WO 2011/010274 | 1/2011 |
| WO | WO 2011/045776 | 4/2011 |
| WO | WO 2011/047895 | 4/2011 |
| WO | WO 2011/051002 | 5/2011 |
| WO | WO 2011/069805 | 6/2011 |
| WO | WO 2011/072888 | 6/2011 |
| WO | WO 2011/092011 | 8/2011 |
| WO | WO 2011/095928 | 8/2011 |

OTHER PUBLICATIONS

"Large-Scale Linearization Circuit for Electrostatic Motors" IBM Technical Disclosure Bulletin, U.S. IBM Corporation, Bulletin, U.S. IBM Corporation, vol. 37, No. 10, pp. 563-564, Oct. 1, 1994.
ASCO RedHat, "2-Way Normally Closed General Purpose & Watertight Enclosure Gas Shutoff Valves ¾" to 3" NPT, 2/2 Series 8214 (200)," 8 pages, prior to Dec. 15, 2011.
ASCO RedHat, "2-Way Normally Closed General Purpose & Watertight Enclosure Gas Shutoff Valves ¾" to 3" NPT, 2/2 Series 8214 (200) AH(E) V710(B)," 6 pages, prior to Dec. 15, 2011.
ASCO Valve, Inc., "8290 Series Angle Body Piston Valves, Introducing the All New 8290 Assembly Configurator," 12 pages, prior to Dec. 15, 2011.
ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.
Athavale et al., "Coupled Electrostatics-Structures-Fluidic Simulations of a Bead Mesopump," Proceedings of the International Mechanical Engineers Congress & Exhibition, pp. 1-7, Oct. 1999.
Bertz et al., "Silicon Grooves With Sidewall Angles Down to 1° made by Dry Etching", pp. 331-339, prior to Dec. 29, 2004.
Bonne et al. "Actuation-Based Fuel Gas Microsensors", IGT Symposium on "Natural Gas Quality, Energy Measurement, Metering and Utilization Practices", 17 pages, Mar. 2001.
Branebjerg, Gravesen , "A New Electrostatic Actuator Providing Improved Stroke Length and Force." IEEE, pp. 6-11, Feb. 4-7, 1992.
Bustgens et al., "Micropump Manufactured by Thermoplastic Molding" IEEE, pp. 18-21, 1994.
Cabuz et al., "Factors Enhancing the Reliability of Touch-Mode Electrostatic Actuators," Sensors and Actuators 79, pp. 245-250, 2000.
Cabuz et al., "Mesoscopic Sampler Based on 3D Array of Electrostatically Activated Diaphragms," Proceedings of the 10th Int. Conf. on Solid-State Sensors and Actuators, Transducers 1999.
Cabuz et al., "The Dual Diaphragm Pump," 4 pages prior to Dec. 29, 2004.
Cabuz, "Dielectric Related Effects in Micromachined Electrostatic Actuators," IEEE, 1999 Conference on Electrical Insulation and Dielectric Phenomena, pp. 327-332, 1999.
Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Actuator Workshop, Hilton Head, S.C., pp. 296-299, Jun. 8-11, 1998.
Cabuz. "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
U.S. Appl. No. 13/326,353, filed Dec. 15, 2011.
U.S. Appl. No. 13/326,355, filed Dec. 15, 2011.
U.S. Appl. No. 13/326,358, filed Dec. 15, 2011.
U.S. Appl. No. 13/326,361, filed Dec. 15, 2011.
U.S. Appl. No. 13/326,366, filed Dec. 15, 2011.
U.S. Appl. No. 13/326,523, filed Dec. 15, 2011.
U.S. Appl. No. 13/326,691, filed Dec. 15, 2011.
Dungs Combustion Controls, "Double Solenoid Valve Combined Pressure Regulator and Safety Valves Servo Pressure Regulator, MBC- . . . -SE DN 65 DN 125," 8 pages, prior to Dec. 15, 2011.
Dungs Combustion Controls, "Double Solenoid Valve Combined Pressure Regulator and Safety Valves Infinitely Variable Operating Mode, MBC- . . . -VEF DN65-DN100," 8 pages, prior to Dec. 15, 2011.
Dungs Combustion Controls, "Double Solenoid Valve Control and Safety Combination Valve Servo Pressure Controller, DMV-SE 507/11-525/11," 8 pages, prior to Dec. 15, 2011.
Dungs Combustion Controls, "Double Solenoid Valve Regulator and Safety Combination Infinitely Variable Floating Operation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.
Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.

(56) References Cited

OTHER PUBLICATIONS

Dungs Combustion Controls, "Pressure Regulator FRU Circulation Regulator," 4 pages, prior to Dec. 15, 2011.
Dungs Combustion Controls, "Pressure Switch for Gas, Air, Flue Gases and Combustion Products, GW 500 A4, GW 500 A4/2" 6 pages, prior to Dec. 15, 2011.
Dungs Combustion Controls, "Program," 4 pages, prior to Dec. 15, 2011.
Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.
Freund et al., "A Chemically Diverse Conducting Polymer-Based 'Electronic Nose'", Proceedings of the National Academy of Sciences of the United States of America, vol. 92, No. 7, pp. 2652-2656, Mar. 28, 1995.
Halg, "On a Nonvolatile Memory Cell Based on Micro-Electro-Mechanics", IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Kromschroder, "Governor with Solenoid Valve VAD Air/Gas Ratio Control with Solenoid Valve VAG," 8 pages, prior to Dec. 15, 2011.
Kromschroder, "Governor with Solenoid Valve VAD Air/Gas Ratio Control with Solenoid Valve VAG," 24 pages, prior to Dec. 15, 2011.
Kromschroder, "Solenoid Valves for Gas VAS," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Minami K et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Shikida et al., "Characteristics of an Electrostatically-Driven Gas Valve Under High Pressure Conditions," IEEE , pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of an S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . . ," 12 pages, Aug. 11, 2005.
Siemens Building Technologies, Inc., "SKP . . . 15U . . . Gas Valve Actuator with Safety Shutoff Function," Document No. 155-751 SKP15 . . . U . . . , 5 pages, Jul. 1, 2005.
Siemens Building Technologies, Inc., "SKP25 . . . U . . . Air/Gas Ratio Controlling Gas Valve Actuator with Safety Shutoff Function," Technical Instructions Document No. 155-754, SKP25 . . . U, 9 pages, Jul. 1, 2005.
Siemens Building Technologies, Inc., "SKP25 . . . U . . . Pressure Regulating Gas Valve Actuator with Safety Shut-Off Function," Technical Instructions Document No. 155-752, SKP25 . . . U, 7 pages, Jul. 1, 2005.
Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.
Wagner et al., "Bistable Microvalve with Pneumatically Coupled Membranes," IEEE, pp. 384-388, 1996.
www.combustion911.com/products/valve-proving-controls-tc-410.html, "Kromschroeder Valve Proving Controls TC410," 7 pages, prior to Dec. 15, 2011, printed May 23, 2012.
Yang et al., "Fluorescent Porous Polymer Films as TNT Chemosensors: Electronic and Structural Effects", J. Am. Chem. Soc., pp. 11864-11873, 1998.
Yang et al., "Porous Shape Persistent Fluorescent Polymer Films: An Approach to TNT Sensory Materials", J. Am. Chem. Soc., pp. 5321-5322, 1998.
U.S. Appl. No. 13/621,175, filed Sep. 15, 2012.
U.S. Appl. No. 14/521,337, filed Oct. 22, 2014.
CSA, "B149.3S1-07 Supplement No. 1 to CAN/CAS-B149.3-05 Code for the Field Approval of Fuel-Related Components on Appliances and Equipment," 40 pages, Jan. 2007.
European Search Report for EP Application No. 12196394.6 dated May 23, 2013.
European Search Report for EP Application No. 12196396.1 dated Jun. 11, 2013.
European Search Report for EP Application No. 12196398.7 dated Jun. 11, 2013.
Examination Report for EP Application No. 12196398.7, dated Apr. 11, 2014.
Allianz Risk Consulting, "Safety Shutoff Valves for Fuel-Fired Heating Equipment," Tech Talk, vol. 1, 3 pages, Oct. 2012.
Communication of a Notice of Opposition for EP Application Serial No. EP12196398.7, dated Feb. 15, 2016.
Honeywell, "V4730C/V8730C/V4734C 1:1 Gas/Air Servo Regulated Gas Valves, Product Data," 16 pages, 2006.
Honeywell, "V4943A/V8943A On/Off Diaphragm Gas Valves, Product Data," 8 pages, Apr. 2009.
Honeywell, "V5055A-F Industrial Gas Valves, Product Data," 12 pages, Nov. 2012.
https://en.wikipedia.org/wiki/SCADA, "SCADA," 10 pages, printed Mar. 29, 2016.
Maxon Corporation, "Functional Testing of Maxon Shut-off Valves, Valve Technical Data," 3 pages, 2008.
Response to Opposition for EP Application Serial No. EP12196398.7, filed Jul. 15, 2016.
U.S. Appl. No. 14/992,826, filed Jan. 11, 2016.
Korte et al., "Smart Valve Positioners and Their Use in Safety Instrumented Systems," Industrial Valves, pp. 41-47, 2009.
Universal Metering, "SmartValve Wireless Shut-Off Valve," Universal Metering Ltd., 4 pages, prior to Mar. 12, 2013.
Wilkerson, "Understanding Valve Actuator Diagnostics," Control Engineering, vol. 56, No. 11, 4 pages, Nov. 2009.
A Communication of a Letter from the Opponent for EP Application No. 12196398.7 dated Feb. 9, 2017.
Office Action for EP Application No. 14194824.0 dated Jun. 23, 2017.
https://en.wikipedia.org/wiki/SCADA, SCADA—Wikipedia the Free Encyclopedia, 11 pages, printed Mar. 29, 2016.
Allgemein Grundlagen und Anforderungen, EN ISO 5167-1, German Translation, Chapter 3.3.6, p. 8, 2003.

* cited by examiner

GAS VALVE WITH HIGH/LOW GAS PRESSURE DETECTION

TECHNICAL FIELD

The disclosure relates generally to valves, and more particularly, to gas valve assemblies.

BACKGROUND

Valves are commonly used in conjunction with many appliances for regulating the flow of fluid. For example, gas valves are often incorporated into gas-fired appliances to regulate the flow of gas to a combustion chamber or burner. Examples of such gas-fired appliances may include, but are not limited to, water heaters, furnaces, boilers, fireplace inserts, stoves, ovens, dryers, grills, deep fryers, or any other such device where gas control is desired. In such gas-fired appliances, the gas may be ignited by a pilot flame, electronic ignition source, or other ignition source, causing combustion of the gas at the burner element producing heat for the appliance. In many cases, in response to a control signal from a control device such as a thermostat or other controller, the gas valve may be moved between a closed position, which prevents gas flow, and an open position, which allows gas flow. In some instances, the gas valve may be a modulating gas valve, which allows gas to flow at one or more intermediate flow rates between the fully open position and the fully closed position.

SUMMARY

This disclosure relates generally to valves, and more particularly, to gas valve assemblies. In one illustrative but non-limiting example, a valve assembly may be configured to control fuel flow to a combustion appliance in response to sensed and/or monitored pressures about the valve assembly. In some cases, the valve assembly may have one or more pressure sensors positioned at one or more positions along a fluid path of the valve assembly, where the one or more positions may be upstream, intermediate, and/or downstream of valves positioned in the fluid path of the gas valve assembly. The one or more pressure sensors may be configured to sense a measure related to a pressure at the corresponding position with the gas valve assembly, and communicate the sensed measures to a valve controller. The valve controller may compare the communicated sensed measure to a first threshold value and/or a second threshold value. If the communicated measure surpasses the first and/or second threshold value, the valve controller may provide a predetermined output signal indicating a pressure event has occurred, such as a high or low gas pressure event. In some cases, the valve assembly, which may include electronics and pressure sensors, may be replaces or may be used in conjunction with existing mechanical low gas pressure switches and high gas pressure switches typically used to detect high or low gas pressure events.

In some instances, the valve assembly may include a valve body having an inlet port and an outlet port with a fluid path extending between the inlet port and the outlet port. The valve assembly may further include a first gas valve member and a second gas valve member situated in or across the fluid path, where an intermediate volume of the fluid path may be located between the first gas valve member and the second gas valve member. The valve assembly may include one or more pressure sensors positioned upstream of the first valve, and one or more pressure sensors positioned downstream of the second valve, where the pressure sensors may respectively sense an upstream pressure and a downstream pressure. The pressure sensors may communicate sensed pressures and/or other measures related to the sensed pressures to a valve controller.

In some cases, the valve controller may be configured to compare a first measure, related at least in part to one or more of the measures related to an upstream sensed pressure, to a first pressure threshold value. If the first measure surpasses the first pressure threshold value, the valve controller may provide a predetermined first output signal. Illustratively, the first measure may at least track the sensed pressure in the valve body upstream of the first valve. The valve controller may alternatively, or in addition, compare a second measure, related at least in part to one or more of the measures related to a downstream sensed pressure, to a second threshold value. If the second measure surpasses the second pressure threshold value, the valve controller may provide a predetermined second output signal. Illustratively, the second measure may at least track the sensed pressure in the valve body downstream of the second valve.

In some instances, a measure related to a sensed pressure in the valve body at a single location (e.g. upstream of the first valve, intermediate the first and second valves, or downstream of the second valve) may be compared to the first pressure threshold value and the second pressure threshold value to determine if a high or low gas pressure event has occurred.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various illustrative embodiments in connection with the accompanying drawings, in which.

Figure 1:
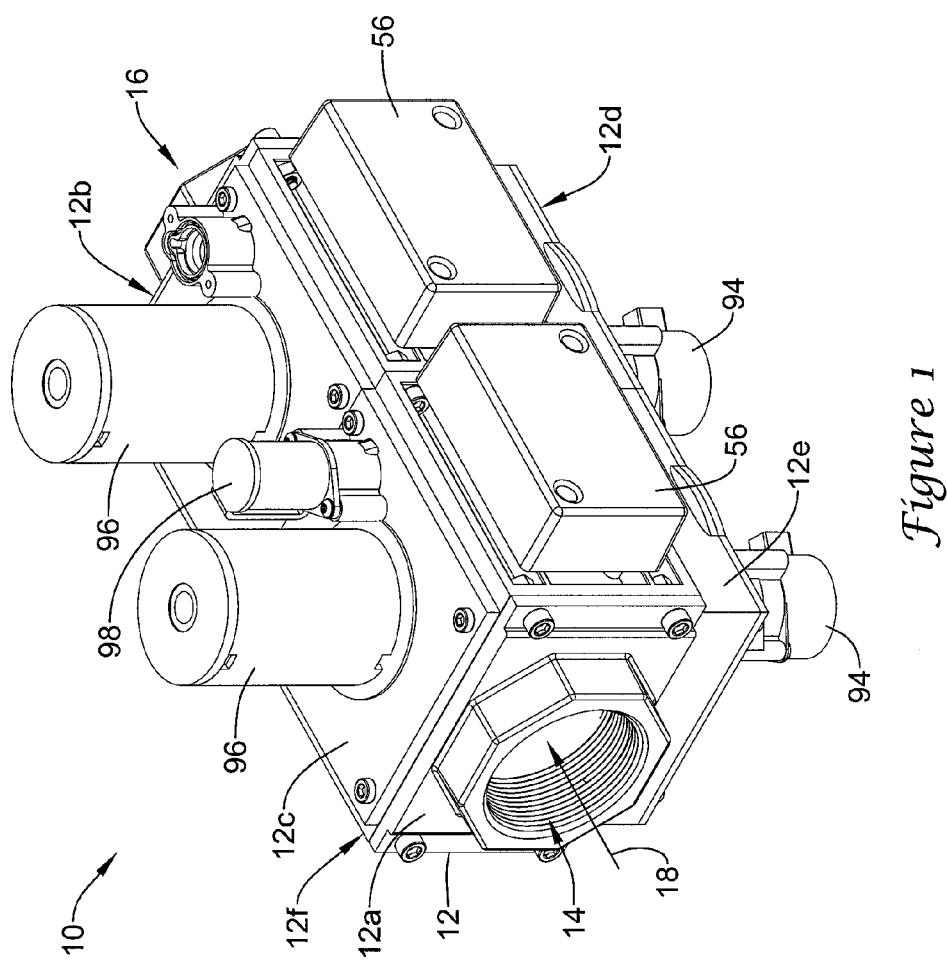
FIG. 1 is a schematic perspective view of an illustrative fluid valve assembly.
Figure 2:
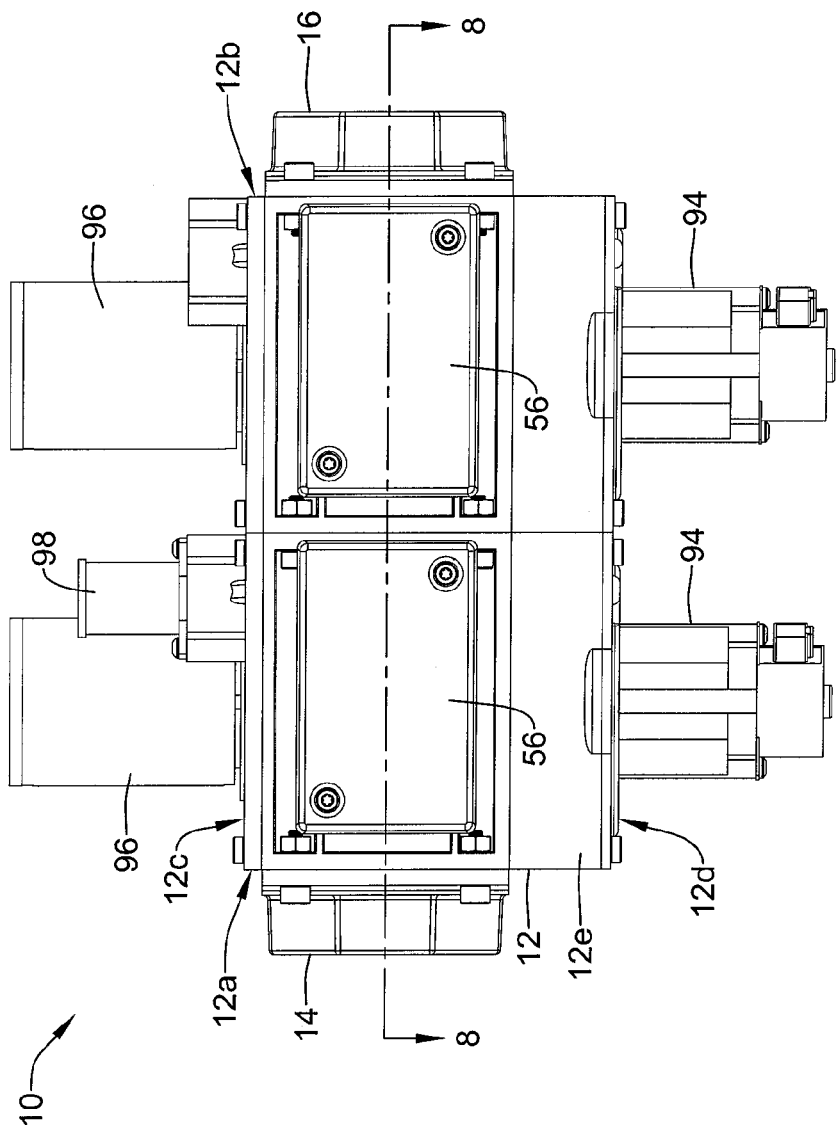
FIG. 2 is a schematic first side view of the illustrative fluid valve assembly of FIG. 1.
Figure 3:
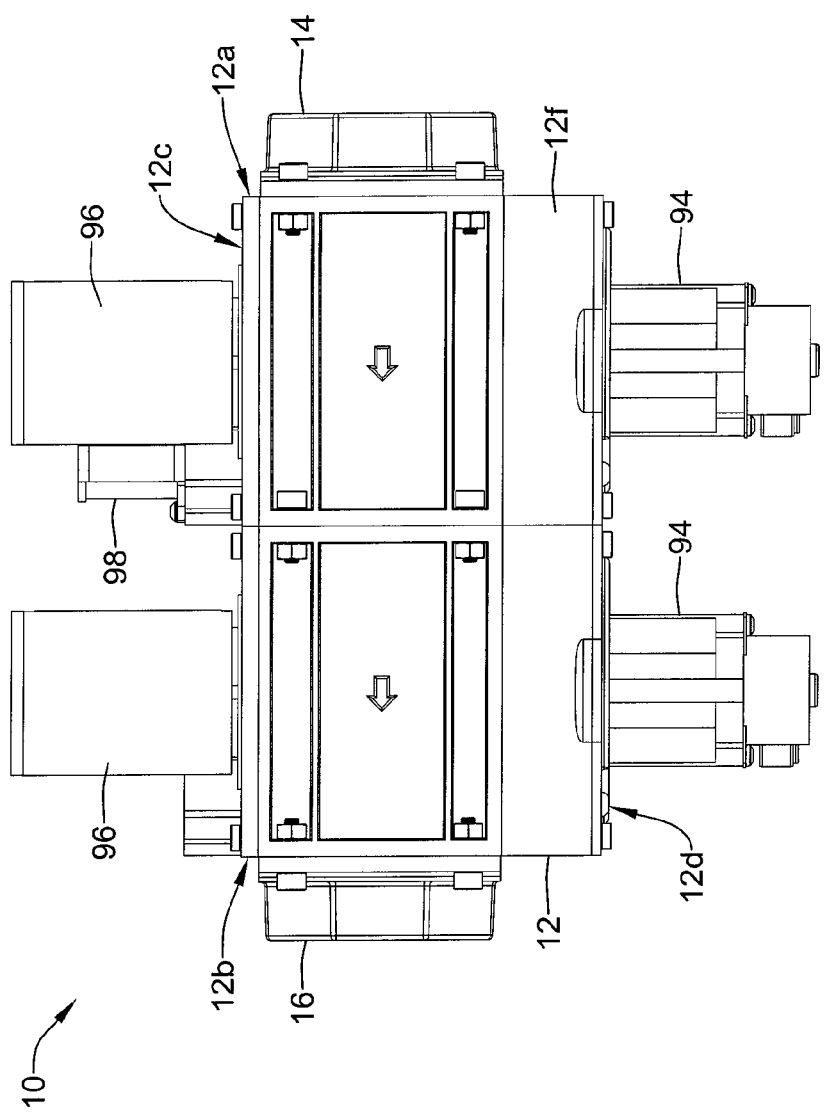
FIG. 3 is a schematic second side view of the illustrative fluid valve assembly of FIG. 1, where the second side view is from a side opposite the first side view.
Figure 4:
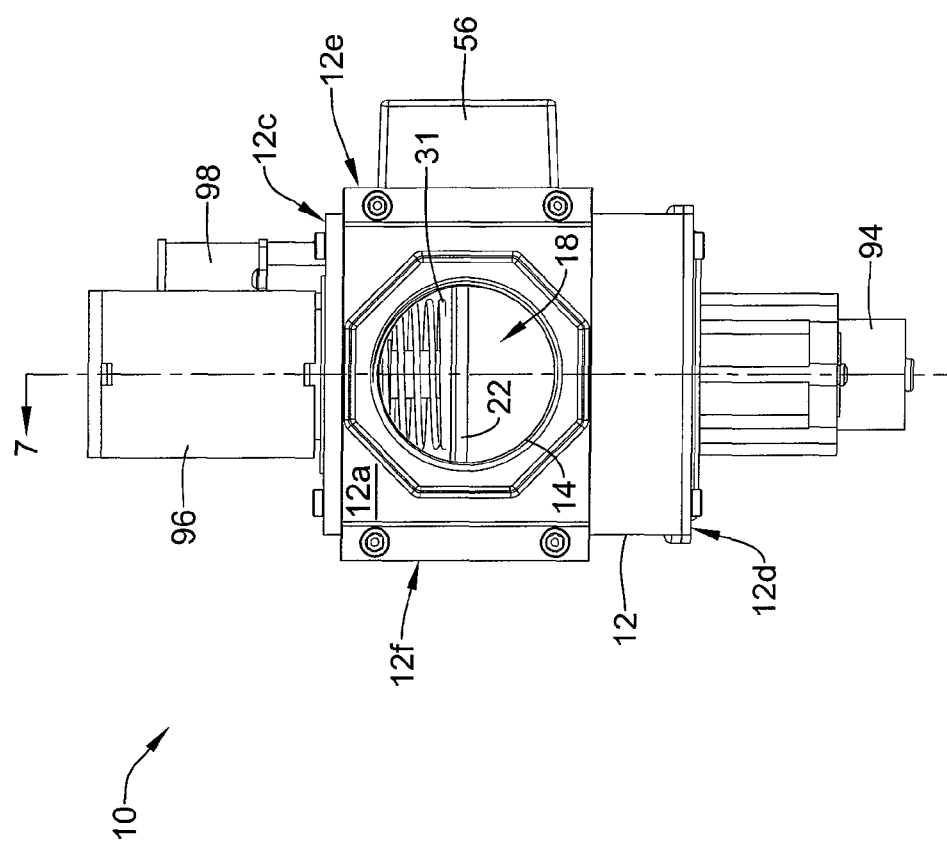
FIG. 4 is a schematic input side view of the illustrative fluid valve assembly of FIG. 1.
Figure 5:
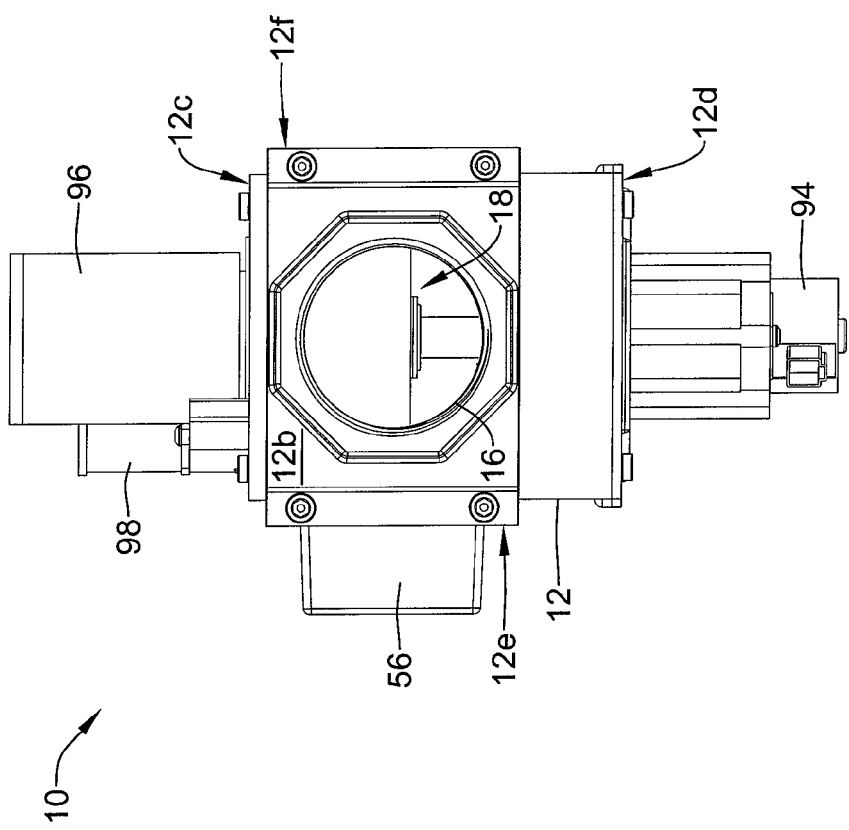
FIG. 5 is a schematic output side view of the illustrative fluid valve assembly of FIG. 1.
Figure 6:
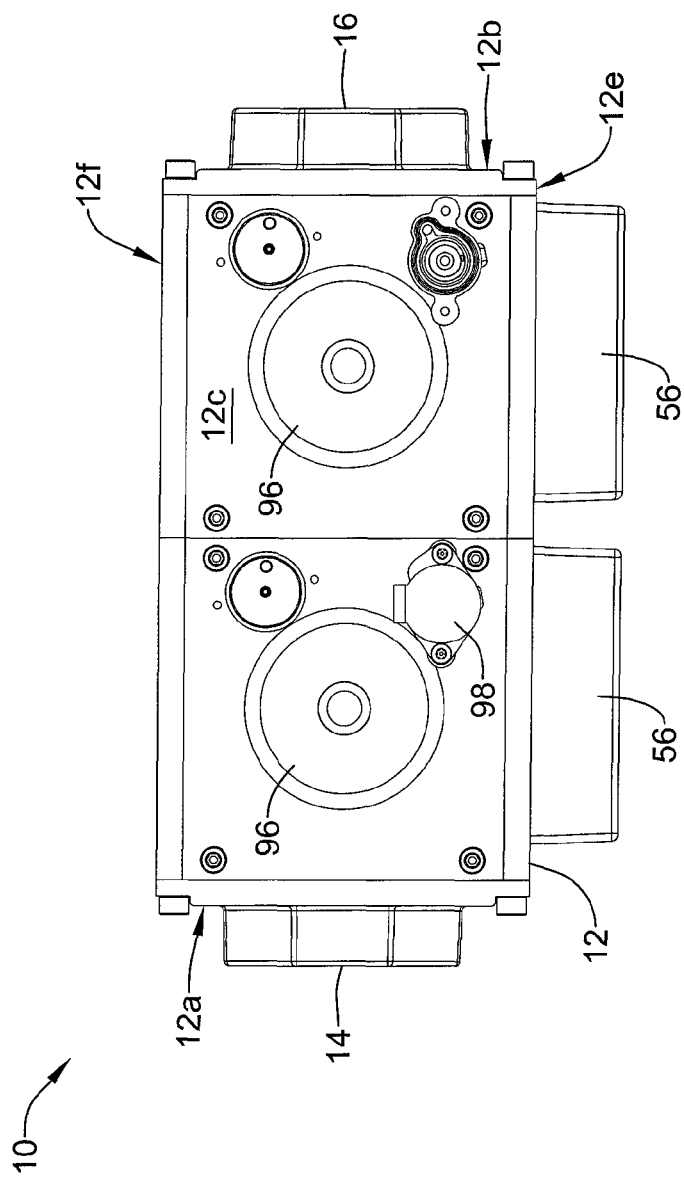
FIG. 6 is a schematic top view of the illustrative fluid valve assembly of FIG. 1.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The detailed description and drawings show several illustrative embodiments which are meant to be illustrative of the claimed disclosure.

Gas valves may be added to fluid path systems supplying fuel and/or fluid to appliances (e.g., burners, etc.) or may be used individually or in different systems. In some instances, gas safety shutoff valves may be utilized as automatic redundant valves. Redundancy is achieved, and often times required by regulatory agencies, by placing at least two safety shutoff valves in series. The aforementioned redundant valves may be separate valves fitted together in the field and/or valves located together in a single valve body, these redundant valves are commonly referred to as double-block valves. In accordance with this disclosure, these and other gas valves may be fitted to include sensors and/or switches and/or other mechanical or electronic devices to assist in monitoring and/or analyzing the operation of the gas valve and/or connected appliance. The sensors and/or switches may be of the electromechanical type or the electronic type, or of other types of sensors and/or switches, as desired.

In some cases, a gas valve assembly may be configured to monitor and/or control various operations including, but not limited to, monitoring fluid flow and/or fluid consumption, electronic cycle counting, overpressure diagnostics, high gas pressure and low gas pressure detection, valve proving system tests, valve leakage tests, proof of valve closure tests, diagnostic communications, and/or any other suitable operation as desired.

Valve Assembly

FIG. 1 is a schematic perspective view of an illustrative fluid (e.g., gas, liquid, etc.) valve assembly 10 for controlling fluid flow to a combustion appliance or other similar or different device. In the illustrative embodiment, the gas valve assembly 10 may include a valve body 12, which may generally be a six sided shape or may take on any other shape as desired, and may be formed as a single body or may be multiple pieces connected together. As shown, valve body 12 may be a six-sided shape having a first end 12a, a second end 12b, a top 12c, a bottom 12d, a back 12e and a front 12f, as depicted in the various views of FIGS. 1-6. The terms top, bottom, back, front, left, and right are relative terms used merely to aid in discussing the drawings, and are not meant to be limiting in any manner.

Figure 7:
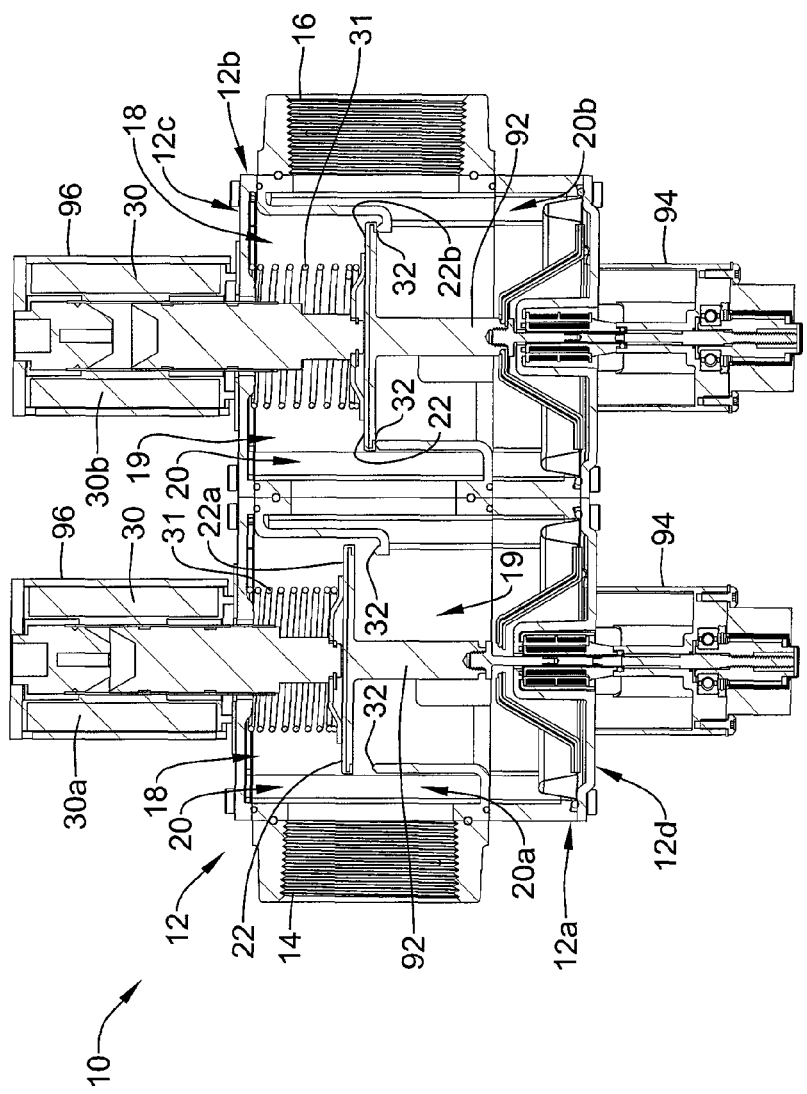
FIG. 7 is a cross-sectional view of the illustrative fluid valve assembly of FIG. 1, taken along line 7-7 of FIG. 4.
Figure 8:
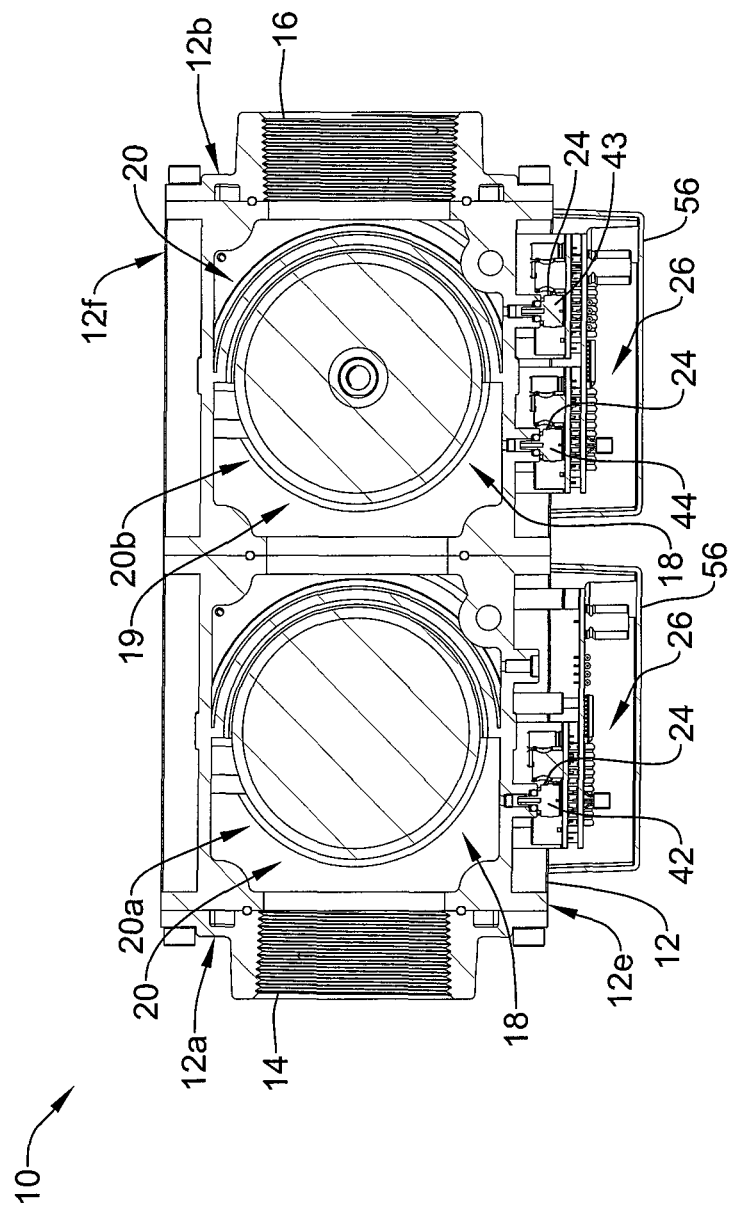
FIG. 8 is a cross-sectional view of the illustrative fluid valve assembly of FIG. 1, taken along line 8-8 of FIG. 2.

The illustrative valve body 12 includes an inlet port 14, an outlet port 16 and a fluid path or fluid channel 18 extending between inlet port 14 and outlet port 16. Further, valve body 12 may include one or more gas valve ports 20 (e.g., a first valve port 20a and a second valve port 20b, shown in FIGS. 7 and 8) positioned or situated in fluid channel 18, one or more fuel or gas valve member(s) sometimes referred to as valve sealing member(s) 22 moveable within gas valve ports 20 (e.g., a first valve sealing member 22a within first valve port 20a and a second valve sealing member 22b within second valve port 20b, as shown in FIG. 7), one or more pressure sensor assemblies 24 (as shown in FIG. 8, for example), one or more position sensors 48, and/or one or more valve controllers 26 (as shown in FIG. 8, for example) affixed relative to or coupled to valve body 12 and/or in electrical communication (e.g., through a wired or wireless connection) with pressure sensor assemblies 24 and position sensor(s) 48.

Valve assembly 10 may further include one or more actuators for operating moving parts therein. For example, valve assembly 10 may have actuators including, but not limited to, one or more stepper motors 94 (shown as extending downward from bottom 12d of valve body 12 in FIG. 1), one or more solenoids 96 (shown as extending upward from top 12c of valve body 12 in FIG. 1), and one or more servo valves 98 (a servo valve 98 is shown as extending upward from top 12c of valve body 12 in FIG. 1-3, where a second servo valve has been omitted), where servo valve 98 may be a 3-way auto-servo valve or may be any other type of servo valve. In one illustrative embodiment, the one or more solenoids 96 control whether the one or more gas valve ports 20 are open or closed. The one or more stepper motors 94 determine the opening size of the gas valve ports 20 when the corresponding gas valve sealing member 22 is opened by the corresponding solenoid 96. Of course, the one or more stepper motors 94 would not be provided when, for example, the valve assembly 10 is not a "modulating" valve that allows more than one selectable flow rate to flow through the valve when the valve is open.

As shown, valve body 12 may include one or more sensor and electronics compartments 56, which in the illustrative embodiment, extend from back side 12e as depicted in FIGS. 1, 2 and 4-6. Sensor and electronics compartments 56 may be coupled to or may be formed integrally with valve body 12, and may enclose and/or contain at least a portion of valve controllers 26, pressure sensors assemblies 24 and/or electronics required for operation of valve assembly 10 as described herein. Although compartments 56 may be illustratively depicted as separate structures, compartments 56 may be a single structure part of, extending from, and/or coupled to valve body 12.

In the illustrative embodiment, the one or more fluid valve ports 20 may include first gas valve port 20a and second gas valve port 20b situated along and/or in communication with fluid channel 18. This is a double-block valve design. Within each gas valve port 20, a gas valve sealing member 22 may be situated in fluid channel 18 and may be positioned (e.g., concentrically or otherwise) about an axis, rotatable about the axis, longitudinally and axially translatable, rotationally translatable, and/or otherwise selectively movable between a first position (e.g., an open or closed position) and a second position (e.g., a closed or open position) within the corresponding valve port 20. Movement of the valve sealing member 22 may open and close valve port 20.

It is contemplated that valve sealing member 22 may include one or more of a valve disk 91, a valve stem 92 and/or valve seal 93 for sealing against a valve seat 32 situated in fluid channel 18, as best seen in FIGS. 14-17, and/or other similar or dissimilar components facilitating a seal. Alternatively, or in addition, valve sealing member 22 may include structural features and/or components of a gate valve, a disk-on-seat valve, a ball valve, a butterfly valve and/or any other type of valve configured to operate from a closed position to an open position and back to a closed position. An open position of a valve sealing member 22 may be any position that allows fluid to flow through the respective gas valve port 20 in which the valve sealing member 22 is situated, and a closed position may be when valve sealing member 22 forms at least a partial seal at the respective valve port 20, such as shown in FIG. 7. Valve sealing member 22 may be operated through any technique. For example, valve sealing member 22 may be operated through utilizing a spring 31, an actuator 30 to effect movement against the spring 31, and in some cases a position sensor 48 to sense a position of the valve sealing member 22.

Valve actuator(s) 30 may be any type of actuator configured to operate valve sealing member 22 by actuating valve sealing member 22 from the closed position to an open position and then back to the closed position during each of a plurality of operation cycles during a lifetime of the gas valve assembly 10 or of actuator 30. In some cases, valve actuator 30 may be a solenoid actuator (e.g., a first valve actuator 30a and a second valve actuator 30b, as seen in FIG. 7), a hydraulic actuator, magnetic actuators, electric motors, pneumatic actuators, and/or other similar or different types of actuators, as desired. In the example shown, valve actuators 30a, 30b may be configured to selectively move valves or valve sealing members 22a, 22b of valve ports 20a, 20b between a closed position, which closes the fluid channel 18 between inlet port 14 and the outlet port 16 of valve body 12, and an open position. The gas valve assembly of FIGS. 1-8 is an example of a gas safety shutoff valve, or double-block valve. In some cases, however, it is contemplated that the gas valve assembly 10 may have a single valve sealing member 22a, or three or more valve sealing members 22 in series or parallel, as desired.

In some cases, valve assembly 10 may include a characterized port defined between inlet port 14 and outlet port 16. A characterized port may be any port (e.g., a fluid valve port 20 or other port or restriction through which fluid channel 18 may travel) at or across which an analysis may be performed on a fluid flowing therethrough. For example, if a flow resistance of a valve port 20 is known over a range of travel of the valve sealing member 22, the one of the one or more gas valve ports 20 may be considered the characterized port. As such, and in some cases, the characterized port may be a port 20 having valve sealing member 22 configured to be in an open position and in a closed position. Alternatively, or in addition, a characterized port may not correspond to a gas valve port 20 having valve sealing member 22. Rather, the characterized port may be any constriction or feature across which a pressure drop may be measured and/or a flow rate may be determined.

In some cases, the characterized port may be characterized at various flow rates to identify a relationship between a pressure drop across the characterized port and the flow rate through the fluid channel 18. In some cases, the pressure drop may be measured directly with one or more pressure sensors 42, 43, 44, and/or 38. In other cases, the pressure drop may be inferred from, for example, the current position of the valve member(s). These are just some examples. In some cases, the relationship may be stored in a memory 37, such as a RAM, ROM, EEPROM, other volatile or non-volatile memory, or any other suitable memory of the gas valve assembly 10, but this is not required.

Figure 9:
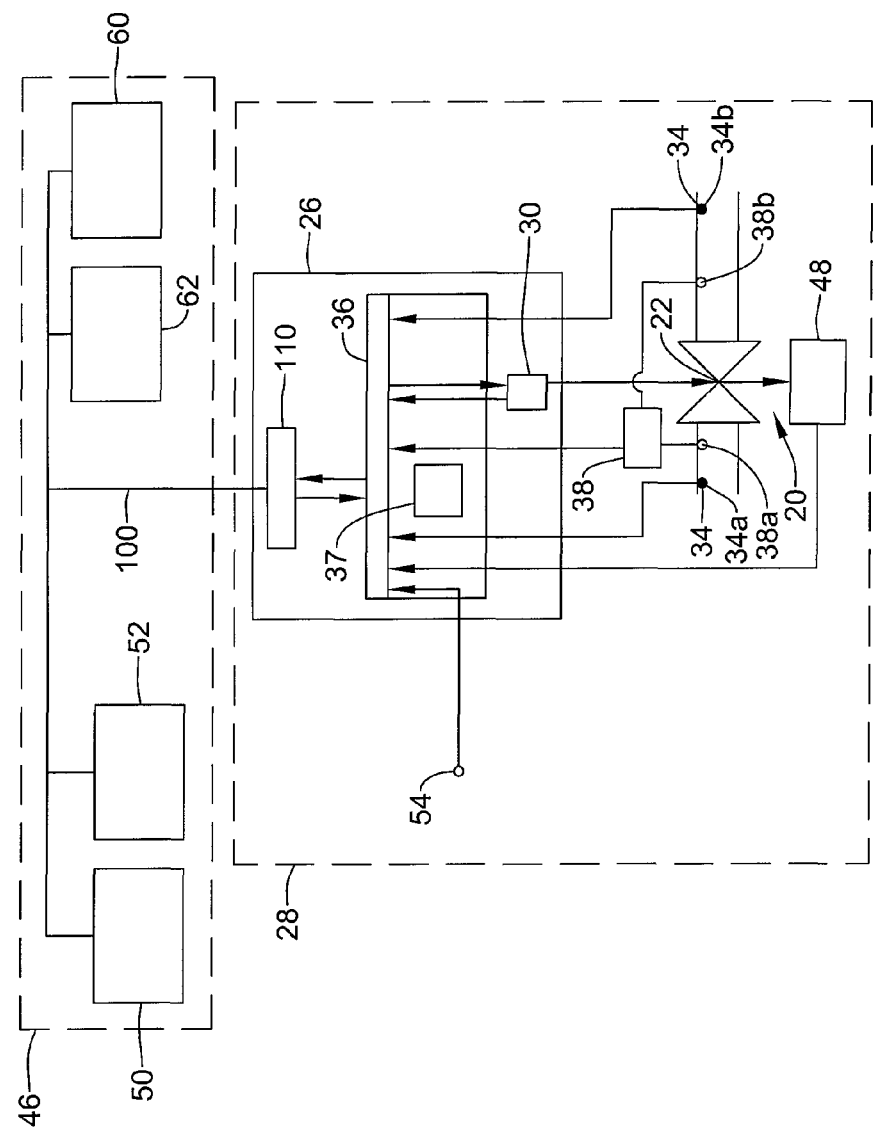
FIG. 9 is a schematic diagram showing an illustrative fluid valve assembly in communication with a building control system and an appliance control system, where the fluid valve assembly includes a differential pressure sensor connect to a valve controller.
Figure 10:
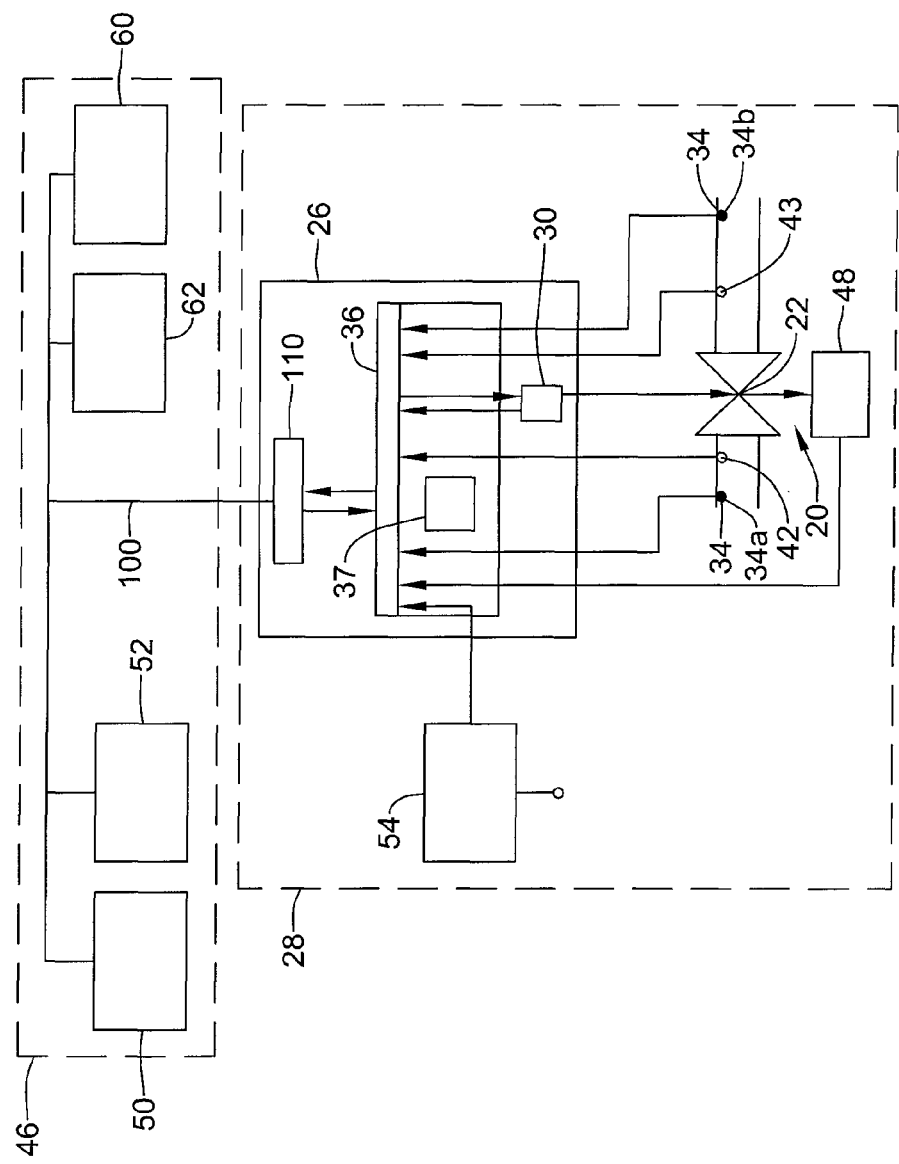
FIG. 10 is a schematic diagram showing an illustrative fluid valve assembly in communication with a building control system and an appliance control system, where the fluid valve assembly includes multiple pressure sensors connected to a valve controller.

In some cases, gas valve assembly 10 may include a flow module 28 for sensing one or more parameters of a fluid flowing through fluid channel 18, and in some cases, determining a measure related to a gas flow rate of the fluid through the fluid channel 18. In some instances, flow module 28 may include a pressure block or pressure sensor assembly 24, a temperature sensor 34, a valve member position sensor 48 and/or a valve controller 26, among other assemblies, sensors and systems for sensing, monitoring and/or analyzing parameters of a fluid flowing through fluid channel 18, such as can be seen in FIGS. 9 and 10.

It is contemplated that flow module 28 may utilize any type of sensor to facilitate determining a measure related to a flow rate of a fluid through fluid channel 18, such a pressure sensor, a flow sensor, a valve position sensor, and/or any other type of sensor, as desired. In one example, the flow module 28, which in some cases may be part of a valve controller 26, may be configured to monitor a differential pressure across a characterized port, and in some cases, a position of one or more valve sealing members 22 of the gas valve assembly 10. The information from monitoring may be utilized by the flow module 28 to determine and monitor the flow rate of fluid (liquid or gas) passing through the fluid channel 18. For example, the flow module 28 may determine a measure that is related to a gas flow rate through the fluid channel 18 based, at least in part, on the measure that is related to the pressure drop across the characterized port along with the pre-stored relationship in the memory 37. In some cases, the current position of one or more valve sealing members 22 of the gas valve assembly 10 may also be taken into account (e.g. is the valve 30% open, 50% open or 75% open).

In some instances, the flow module 28 may be configured to output the flow rate of fluid passing through the fluid channel 18 to a display or a remote device. In some cases, the flow module 28 may maintain a cumulative gas flow amount passing through the fluid channel 18 (e.g. over a time period), if desired. The measure related to a gas flow may include, but is not limited to, a measure of fuel consumption by a device or appliance that is connected to an output port 16 of the gas valve assembly 10.

It is contemplated that electronic valve controller or valve control block 26 (see, FIG. 8-10) may be physically secured or coupled to, or secured or coupled relative to, valve body 12. Valve controller 26 may be configured to control and/or monitor a position or state (e.g., an open position and a closed position) of valve sealing members 22 of valve ports 20 and/or to perform other functions and analyses, as desired. In some cases, valve control block 26 may be configured to close or open gas valve member(s) or valve sealing member(s) 22 on its own volition, in response to control signals from other systems (e.g., a system level or central building control), and/or in response to received measures related to sensed pressures upstream, intermediate, and/or downstream of the characterized valve port(s), measures related to a sensed differential pressure across the characterized valve port(s), measures related to temperature sensed upstream, intermediate, and/or downstream of the characterized valve port(s), and/or in response to other measures, as desired.

The memory 37, which in some cases may be part of valve controller 26, may be configured to record data related to sensed pressures, sensed differential pressures, sensed temperatures, and/or other measures. The valve controller 26 may access this data, and in some cases, communicate (e.g., through a wired or wireless communication link 100) the data and/or analyses of the data to other systems (e.g., a system level or central building control) as seen in FIGS. 9 and 10. The memory 37 and/or other memory may be programmed and/or developed to contain software to affect one or more of the configurations described herein.

In some instances, valve controller 26 may be considered a portion of flow module 28, flow module 28 may be considered part of valve controller 26, or the flow module 28 and valve controller 26 may be considered separate systems or devices. In some instances, valve controller 26 may be coupled relative to valve body 12 and one or more gas valve ports 20, where valve controller 26 may be configured to control a position (e.g., open or closed positions, including various open positions) of valve sealing member 22 within valve port 20. In some cases, the valve controller 26 may be coupled to pressure sensor assembly 24, temperature sensor 34, position sensor 48, and/or other sensors and assemblies, as desired.

In the illustrative embodiment of FIG. 8, valve controller 26 may be configured to monitor a differential pressure across a characterized port. In some instances, valve controller 26 may monitor a differential pressure across fluid valve port 20 and/or monitor a measure related to a pressure upstream of a fluid valve port 20 (e.g., first valve port 20a) and/or a measure related to a pressure downstream of a fluid valve port 20 (e.g., second valve port 20b). The valve controller 26 may also be configured to monitor an axial position of the valve sealing member 22 in valve port 20. As a result, valve controller 26 may determine a flow rate of fluid passing through the characterized port, where valve controller 26 may determine the flow rate (and sometimes fluid consumption) based, at least in part, on the monitored differential pressure and/or monitored upstream and downstream pressures in conjunction with a pre-characterized relationship between the pressure drop across the characterized port and the flow rate. In some cases, the monitored axial positioning of valve sealing member 22 may also be taken into account, particularly when the valve sealing member 22 may assume one or more intermediate open positions between the fully closed and fully opened positions. When so provided, the pre-characterized relationship between the pressure drop across the characterized port and the flow rate may depend on the current axial positioning of valve sealing member 22.

In some instances, valve controller 26 may include a determining block, which may include a microcontroller 36 or the like, which may include or be in communication with a memory, such as a non-volatile memory 37. Alternatively, or in addition, determining block (e.g. microcontroller 36) may be coupled to or may be configured within valve control block or valve controller 26. Determining block may be configured to store and/or monitor one or more parameters, which may be used when determining a measure that is related to a fluid flow rate through fluid channel 18. Determining block (e.g. microcontroller 36) may be configured to use the stored and/or monitored parameters (e.g. the relationship between a pressure drop across a characterized port and the flow rate through the fluid channel 18) stored in the memory 37 to help determine a measure that is related to a fluid flow rate through fluid path or fluid channel 18.

Illustratively, determining block (e.g. microcontroller 36) may be configured to determine and/or monitor a measure (e.g., a flow rate of fluid passing through the characterized port or other similar or different measure, as desired) based, at least in part, on stored and/or monitored measures including, but not limited to, measures related to pressure drop across a characterized valve port or other pressure related measures upstream and downstream of the characterized valve port, a temperature of the fluid flowing through fluid channel 18, and/or a measure related to a current position of valve sealing member 22 at gas valve port 20 or the size of an opening at the characterized port. In one example, a determining block (e.g. microcontroller 36) may include non-volatile memory 37 that is configured to store opening curves of valve assembly 10, where the opening curves may characterize, at least in part, a flow rate as a function of a sensed axial position of valve sealing member 22, and a sensed differential pressure across a characterized valve port 20 or an otherwise determined pressure at or adjacent a characterized valve port 20 (e.g., knowing a set-point of an upstream pneumatic pressure reducing valve (PRV), as the set-point pressure of the PRV may be substantially equal to the pressure at an inlet of the characterized valve port), and may facilitate determining an instantaneous and/or cumulative fluid (e.g., fuel) flow in fluid channel 18 and/or consumption by an appliance in fluid communication with valve assembly 10.

It is contemplated that determining block (e.g. microcontroller 36) may continuously or non-continuously control, store, and/or monitor a position (e.g., an axial or rotary position or open/closed state or other position) of valve sealing member 22 within valve port 20, monitor a differential pressure across the characterized port, and/or monitor a temperature upstream and/or downstream of the characterized port. In addition, microcontroller 36 may continuously or non-continuously determine the flow rate of the fluid passing through the characterized port, where microcontroller 36 may be configured to record in its memory or in another location, an instantaneous flow rate of fluid flowing through the characterized port, a cumulative flow volume, and/or a determined instantaneous or cumulative (e.g., total) fluid consumption based on the positions of valve sealing member(s) 22 and determined flow rates at an instant of time or over a specified or desired time period. In addition, determining block (e.g. microcontroller 36) may be configured to report out the instantaneous flow rate, cumulative flow volume and/or total or cumulative fluid consumption over a given time period. Determining block (e.g. microcontroller 36) may report the instantaneous flow rate, cumulative flow rate, and/or total or cumulative consumption of the fluid flowing through the characterized port to system display 52 of an overall system controller 50 (e.g., a building/industrial automation system (BAS/IAS) controller), an appliance display 62 of an appliance controller 60 where the appliance may be configured to receive the flowing fluid, a display adjacent gas valve assembly 10, or any other display, device, controller and/or memory, as desired.

In some instances, valve controller 26 may include or be in communication with a valve actuator 30, which in conjunction with stepper motor 94 or other device is configured to position valve sealing member 22 in valve port 20. Valve actuator 30 and/or stepper motor 94 may be in communication with microcontroller 36 of valve controller 26, and microcontroller 36 may be configured to control, monitor, and/or record the position (e.g., axial position, radial position, etc.) of valve sealing member 22 within valve port 20 through valve actuator 30 (e.g., valve actuator 30 may be configured to effect the locking (e.g., valve actuator 30 OFF) or the unlocking (e.g., valve actuator 30 ON) of the valve sealing member 22 in a particular position) and stepper motor 94 (e.g., stepper motor 94 may be configured to adjust the position of valve sealing member 22 when it is not locked in a particular position), or through only stepper motor 94. Alternatively, or in addition, microcontroller 36 may be configured to monitor and record the position of valve sealing member 22 within valve port 20 through a connection with a position sensor 48 or through other means.

Microcontroller 36 may continuously or non-continuously monitor and record the position (e.g., axial position, radial position, etc.) of valve sealing member 22 within valve port 20 through valve actuator 30 and stepper motor 94, and microcontroller 36 may indicate the sensed and/or monitored position of valve sealing member 22 within valve port 20 as a prescribed position of valve sealing member 22. The prescribed position of valve sealing member 22 may be the position at which valve sealing member 22 was and/or is to be located, whereas a position of valve sealing member 22 sensed by position sensor system 48 may be considered an actual position of valve sealing member 22 within valve port 20.

In some instances, valve controller 26 may be configured to perform electronic operational cycle counting or may include an electronic counter configured to count each operational valve cycle of valve sealing members 22 during, for example, the lifetime of gas valve assembly 10 or during some other time period. In some cases, microprocessor 36 of valve controller 26 may be configured to monitor a total number of operational cycles (e.g., the number of times fuel valve sealing members 22 are operated from a closed position to an open position and back to a closed position) of valve ports 20 and measures related thereto. In some cases, microprocessor 36 may store such data in a non-volatile memory, such as memory 37, sometimes in a tamper proof manner, for record keeping and/or other purposes. Microprocessor 36 may monitor the number of cycles of valve sealing members 22 in one or more of several different manners. For example, microprocessor 36 may monitor the number of cycles of valve sealing members 22 by monitoring the number of times first main valve switch 72 and/or second main valve switch 74 are powered or, where one or more control signals may be provided to fuel valve actuator(s) 30 controlling when fuel valve actuator(s) 30 selectively moves (e.g., opens or closes) valve sealing member(s) 22, microprocessor 36 may monitor the one or more control signals.

Figure 11:
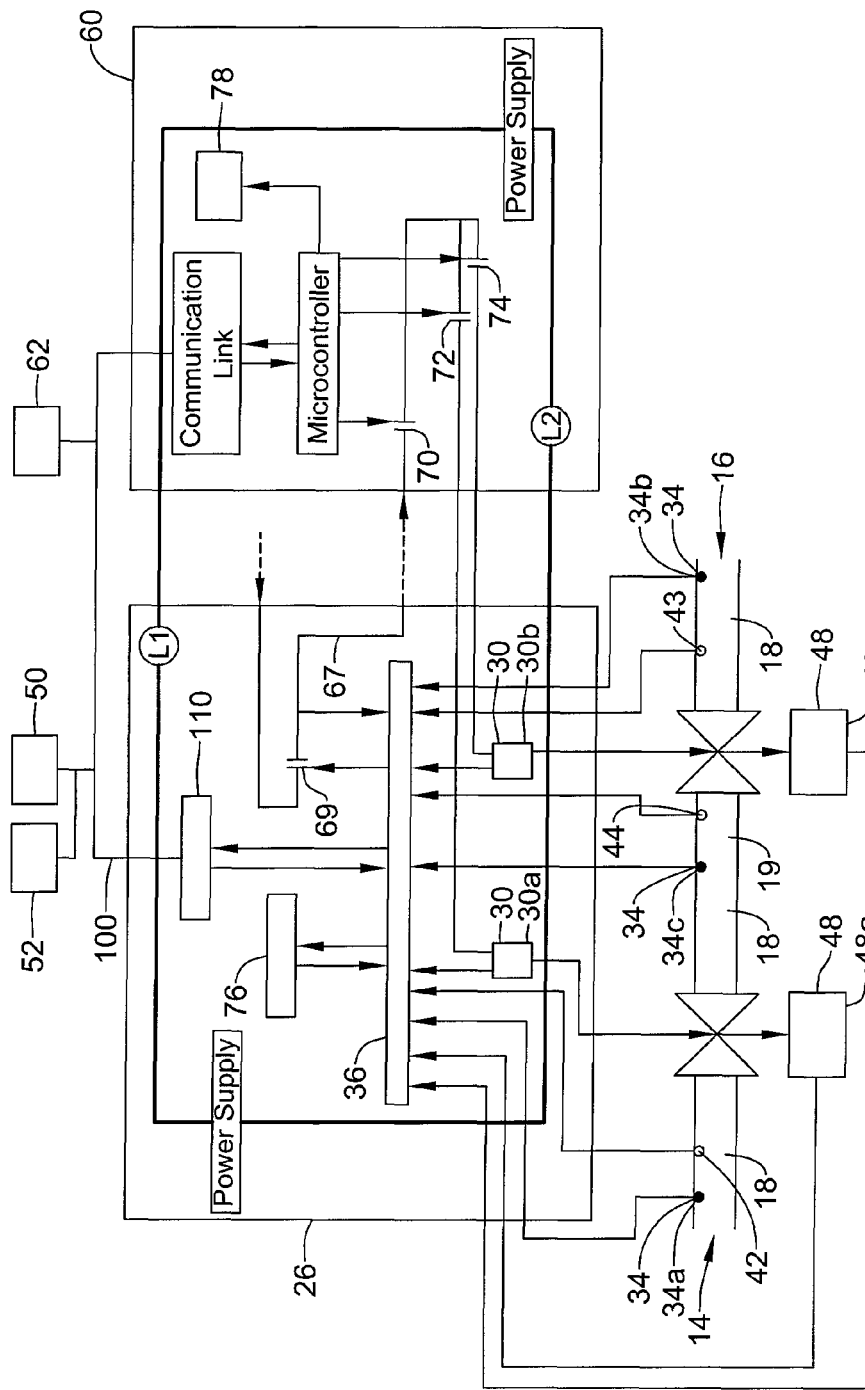
FIG. 11 is a schematic diagram showing an illustrative schematic of a low gas pressure/high gas pressure limit control.
Figure 12:
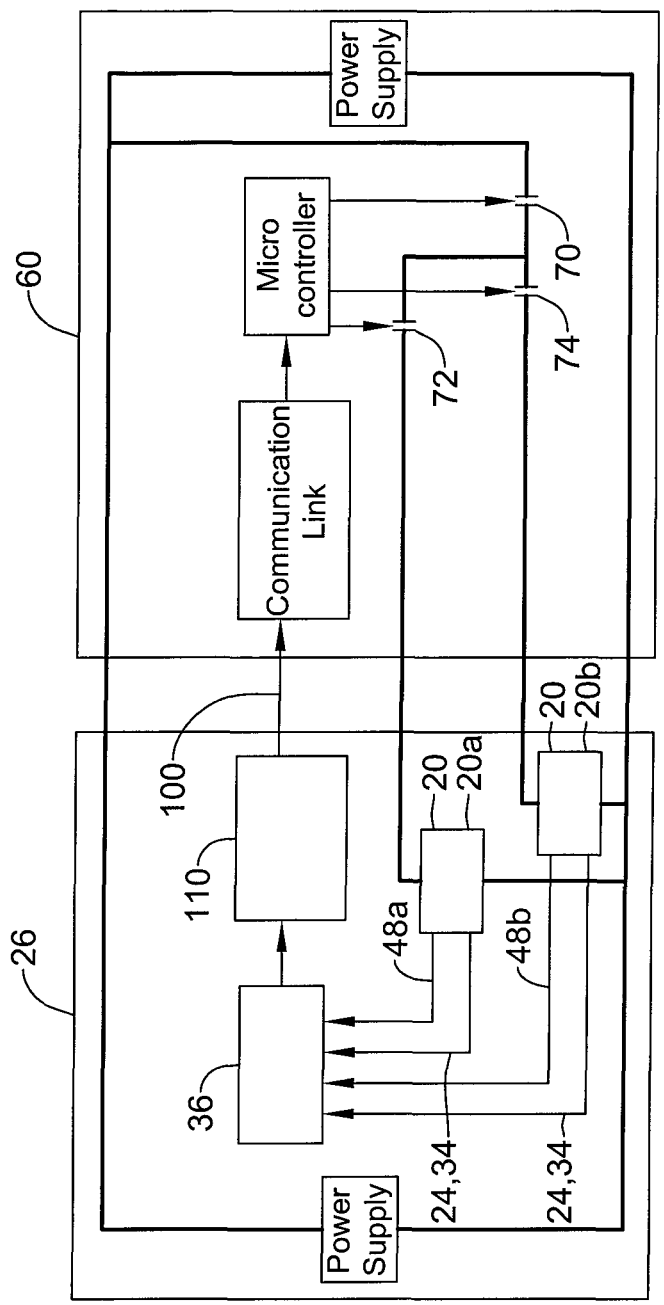
FIG. 12 is a schematic diagram showing an illustrative schematic valve control and combustion appliance control, where the controls are connected via a communication link.

Valve controller 26, in some cases, may monitor main valve switches 72, 74 by receiving signals directly from a device located remotely from valve assembly 10 on which main valve switches 72, 74 may be located (e.g. see FIGS. 11-12). Switches ((main valve switches 72, 74 and safety switch 70 (discussed below)) may be any mechanism capable of performing a switching function including, but not limited to, relays, transistors and/or other solid state switches and circuit devices and/or other switches. Valve controller 26 may include a electrical port, sometimes separate from a communications interface 110 (discussed below), for receiving one or more control signals from the device located remotely from valve assembly 10. The one or more control signals received via the electrical port may include, but are not limited to: a first valve port 20a control signal that, at least in part, may control the position of first valve sealing member 22a via first valve actuator 30a, and a second valve port 20b control signal that, at least in part, may control the position second valve sealing member 22b via second valve actuator 30b.

As an alternative to monitoring control signals, or in addition, microprocessor 36 may monitor the number of cycles of valve sealing members 22 by monitoring data from a position sensor 48. For example, microprocessor 36 of valve controller 26 may monitor position sensor 48 and record the number of times valve sealing members 22 are in an open position after being in a closed position and/or the number of times valve sealing members 22 are in a closed position after being in an open position and/or the number of times valve sealing members are operated from a close position to an open position and back to a closed position. These are just some examples. Further, if valve controller 26 is operating valve sealing members 22, valve controller 26 may monitor the number of operational cycles by counting its own control signals sent to valve actuators 30 and/or stepper motors 94.

The non-volatile memory 37, which may maintain and/or store the number of operational valve cycles, may be positioned directly on, or packaged with, valve body 12 (e.g., on or within memory of microcontroller 36) and/or may be accessible by valve controller 26. Such storage, placement and/or packaging of valve cycle data may allow for replacement of components in the overall system (e.g., an appliance control 60, etc.) without losing the valve cycle data. In an illustrative instance, valve cycle data may be securely stored, such that it may not be tampered with. For example, the valve cycle data may be stored the non-volatile memory 37 of valve controller 26 and the valve cycle data may be password protected.

Microcontroller 36 of valve assembly 10 may be configured to compare a count of a total number of operational cycles of valve sealing members 22 to a threshold number of operational cycles. In an instance where the counted number of operational cycles of the valve sealing member(s) 22t approaches, meets, or exceeds the threshold number of cycles, microcontroller 36 may initiate a warning and/or request a switch 69 in a limit string 67 to open and thus, remove or cut power to valve switches 72, 74 and fuel valve actuator(s) 30. Alternatively, or in addition, microcontroller 36 may send a signal to initiate an alarm and/or put the system in a safety lockout, or microcontroller 36 may be configured to take other action as desired. Illustratively, microcontroller 36 may be configured to prevent fuel valve actuator(s) 30 from allowing valve sealing member(s) 22 to open after the total number of operational cycles meets and/or exceeds the threshold number of operational cycles. In some instances, the threshold number of cycles may be related to the number of cycles for which valve assembly 10 is rated (e.g., a maximum number of cycles before failures might be expected, etc.) or related to any other benchmark value. In addition, microcontroller 36 may be configured to perform other diagnostics based on analyzing captured operational cycle data, where the other diagnostics may include number of cycles, time duration of cycles, and similar or different diagnostics, as desired.

Valve controller 26 may include an I/O or communications interface 110 with a communication protocol for transmitting data to and/or otherwise communicating with one or more remote device(s) that may be located remotely from valve assembly 10 (e.g., a combustion appliance including controller 60 located remotely from valve assembly 10). Communications interface 110 may be a wired or wireless communication interface, where the wired or wireless communication interface 110 may be configured to be compatible with a predetermined communication bus protocol or other communication protocol. A wired link may be low voltage (e.g. 24V, 5V, 3V, etc.), which may reduce certain issues related to line-voltage wiring schemes. Illustratively, communications interface 110, using the predetermined communication bus protocol or other communication protocol, may be configured to output and/or communicate one or more valve conditions, one or more measures related to valve conditions, one or more conditions related to a fluid flow through fluid channel 18, and/or one or more diagnostic parameters, conditions or events, to a device located adjacent or remote from valve assembly 10.

As discussed, valve controller 26 may be configured to determine one or more valve conditions based on one or more diagnostic parameters related to fluid channel 18 sensed by one or more sensor(s) (e.g., a pressure sensor, etc.) in communication with fluid channel 18. The diagnostic parameters may be determined by valve controller 26 and stored in a non-volatile memory 37 or other memory accessible by valve controller 26. The diagnostic parameters may include, but are not limited to, a total number of operational cycles, a fuel usage parameter, one or more fault history parameters, one or more user or factory or other setting parameters, self diagnostic check parameters, fault parameters and/or other similar or dissimilar parameters, as desired. The communicated valve condition(s) or measure(s) related to the valve condition(s) may be determined by valve controller 26 or one or more remote devices. Illustrative valve conditions and measures related to valve conditions may include, but are not limited to: high fuel pressure conditions, low fuel pressure conditions, valve closure conditions, valve leak conditions, safety event condition, and/or other similar or dissimilar valve conditions and/or outputs.

In addition to communication interface 110 being configured to output information to a device located adjacent or remote from valve assembly 10, communication interface 110 may be configured to receive one or more inputs from the remote device or an adjacently positioned device. Illustrative inputs may include, but are not limited to: an acknowledgement of reception of one or more of the valve conditions, a user setting, a system setting, a valve command, and/or other similar or dissimilar input.

In some instances, valve controller 26 may communicate through the I/O interface or communication interface 110 with a remotely located output block 46, where output block 46 may display and/or output a determined measure related to fluid flow rate through fluid channel 18, sometimes along with other data, information and controls sent from valve controller 26 (see, for example, FIGS. 9 and 10). Output block 46 may include a display and/or other remote systems, and microcontroller 36 may be configured to send measures to a device control system 60 or building automation system or overall system controller 50 of output block 46 for further monitoring and/or analysis. As discussed, the I/O interface may include a wired and/or wireless interface between valve controller 26 (e.g., microcontroller 36) and output block 46 systems (e.g., building automation system or overall system controller 50, combustion appliance management system 60, handheld device, laptop computer, smart phone, etc.), where the connection between valve controller 26 may or may not be made with communication link 100 (e.g., communication link 100 could, but need not be, the one and only one communication link).

In an illustrative operation, valve controller 26 may be utilized in a method for communicating information between valve assembly 10 and a combustion appliance controller 60, where the combustion appliance controller 60 may be associated with a combustion appliance (e.g., a device separate from, and possibly remotely relative to valve assembly 10) for which valve assembly 10 may control a flow of fuel. The operation may include sensing, with one or more sensor (e.g., pressure sensor assembly 24), one or more sensed parameters within fluid channel 18 of valve assembly 10. The sensed parameter may be stored in a non-volatile memory 37, or other memory, of valve controller 26. Valve controller 26 may determine one or more valve conditions (e.g., a safety event condition) based on the one or more sensed parameters. For example, valve controller 26 may compare the one or more sensed parameters to a threshold parameter to determine one or more valve conditions. If one or more valve conditions have been determined, valve controller 26 may be configured to send information that may be related to the one or more determined valve conditions from valve assembly 10 to the combustion appliance controller 60 (or other controller or device) across a communication link or bus 100 connected to a communications interface 110.

In one example, upon receiving one or more determined valve conditions, such as a safety event condition, combustion appliance controller 60 (or other controller or device) may be configured to open safety switch 70, such that power to a valve control signal that is coupled to one or more valve actuators 30 is cut, thereby automatically closing one or more valve ports 20 (e.g., closing valve sealing member(s) 22 of valve port(s) 20). In some cases, safety switch 70 may be controlled by an algorithm in combustion appliance controller 60, where an output of the algorithm is affected by information passed via the communication link 100. Additionally, or in the alternative, other feedback signals may affect an output of the algorithm, where the other feedback signals may or may not be passed via the communication link 100 and may or may not originate from valve assembly 10.

In other illustrative operations, a low gas pressure/high gas pressure event may be reported from valve controller 26 to combustion appliance controller 60. In response to receiving a reported low gas pressure/high gas pressure event, combustion appliance controller 60 may be configured to open safety switch 70. Further, in cases where a proof of closure event is reported to combustion appliance controller 60 prior to ignition of the combustion appliance, an ignition sequence may not be started. In certain other instances where a Valve Proving System (VPS) sequence test is being performed, a combustion appliance controller 60 may use reported results of the VPS sequence test to make an evaluation. For example, if in the evaluation of the VPS test it were determined that a valve was leaking, the appliance controller 60 might be programmed to open safety switch 70, to initiate a safety lockout, to initiate an alarm, and/or to take any other similar or dissimilar measure.

In other scenarios, valve assembly 10 may be used as a control valve and in that case, valve controller 26 may send a signal to combustion appliance controller 60 indicative of a valve position, and combustions appliance controller 60 may respond accordingly. These other scenarios, for example, may be applied in parallel positioning system applications, low fire switch applications, auxiliary switch applications, etc. Additionally, it is contemplated that valve controller 26 may interact with remote devices in other similar and dissimilar manners within the spirit of this disclosure.

Pressure block or pressure sensor assembly 24 may be included in flow module 28, as seen in FIGS. 9 and 10, and/or pressure sensor assembly 24 may be at least partially separate from flow module 28. Pressure sensor assembly 24 may be configured to continuously or non-continuously sense pressure or a measure related to pressure upstream and/or downstream of a characterized port and/or along other portions of fluid channel 18. Although pressure sensor assembly 24 may additionally, or alternatively, include a mass or volume flow meter to measure a flow of fluid through fluid channel 18, it has been contemplated that such meters may be more expensive and difficult to place within or outside the valve assembly 10; thus, a useful, relatively low cost alternative and/or additional solution may include placing pressure sensors 38, 42, 43, 44 and/or other pressure sensors within, about and/or integrated in valve body 12 of valve assembly 10 to measure the fluid flow through fluid channel 18, the pressures at the input and output ports, and/or other similar or different pressure related measures. Pressure sensors 38, 42, 43, 44 may include any type of pressure sensor element. For example, the pressure sensor element(s) may be MEMS (Micro Electro Mechanical Systems) pressure sensors elements or other similar or different pressure sensor elements such as an absolute pressure sense element, a gauge pressure sense element, or other pressure sense element as desired. Example sense elements may include, but are not limited to, those described in U.S. Pat. Nos. 7,503,221; 7,493,822; 7,216,547; 7,082,835; 6,923,069; 6,877,380, and U.S. patent application publications: 2010/0180688; 2010/0064818; 2010/00184324; 2007/0095144; and 2003/0167851, all of which are hereby incorporated by reference.

In some cases, pressure sensor assembly 24 may include a differential pressure sensor 38 for measuring a differential pressure drop across a characterized valve port 20, or across a different characterized port, as seen in FIG. 9. A pressure sensor assembly 24 including a differential pressure sensor 38, may be exposed to both a first pressure 38a upstream of a characterized valve port and a second pressure 38b downstream of the characterized valve port. Differential pressure sensor 38 may send a measure related to the sensed differential pressure to the microcontroller 36 of valve controller 26, as seen from the diagram of FIG. 9. Microcontroller 36 may be configured to monitor the differential pressure across the characterized port with the differential pressure measures sensed by differential pressure sensor 38.

Alternatively, or in addition, an illustrative pressure sensor assembly 24 may include one or more first pressure sensors 42 upstream of a characterized valve port and one or more second pressure sensors 43 downstream of the characterized valve port, where first and second pressure sensors 42, 43 may be in fluid communication with fluid channel 18 and may be configured to sense one or more measures related to a pressure upstream and a pressure downstream, respectively, of the characterized valve port, as seen in FIG. 10. Where a second valve port (e.g., second valve port 20b) may be positioned downstream of a first characterized valve port (e.g. first valve port 20a) and forming an intermediate volume 19 between first and second valve ports, pressure sensor assembly 24 may include one or more third pressure sensors 44 in fluid communication with the intermediate volume 19, which may sense one or more measures related to a pressure in the intermediate volume 19. Where two characterized ports are utilized, first pressure sensors 42 may be upstream of both characterized ports, second pressure sensors 43 may be downstream of both characterized ports, and third pressure sensors 44 may be downstream from the first characterized port and upstream from the second characterized, but this is not required (e.g., first and second pressure sensors 42, 43 may be used to estimate the pressure drop across the valves). Additionally, or in the alternative, one or more differential pressure sensors 38 may be utilized to estimate the pressure drop across the first characterized port and/or the second characterized port. It is further contemplated that valve ports 20 may not be characterized ports.

Pressure sensors 42, 43, 44 may be configured to send each of the sensed measure(s) directly to microcontroller 36. Microcontroller 36 may be configured to save the sensed measures and/or related information to a non-volatile memory 37, and may perform one or more analyses on the received sensed measures. For example, microcontroller 36, which may be a portion of flow module 28 and/or valve controller 26, may determine a measure that is related to a fluid flow rate through the fluid path based, at least in part, on the received sensed measures related to pressure upstream of the characterized port and on the received sensed measures related to pressure downstream of the characterized port.

Where a valve assembly 10 includes one or more valve ports 20, pressure sensor assembly 24 may include first pressure sensor 42 positioned upstream of first valve port 20a at or downstream of inlet port 14, as seen in FIG. 11. In addition, or alternatively, pressure sensor assembly 24 may include a second pressure sensor 43 positioned downstream of second valve port 20b at or upstream from outlet port 16. Valve assembly 10 may further include one or more third pressure sensors 44 downstream of first valve port 20a and upstream of second valve port 20b. Pressure sensors 42, 43, 44 may be configured to sense a pressure and/or a measure related to the pressure in fluid channel 18, and to communicate the sensed measures to valve controller 26, which is physically coupled to or positioned within valve body 12. Where multiple pressure sensors 42, 43, 44 exist at or near one or more location (e.g., upstream of valve ports 20, intermediate of valve ports 20, downstream of valve ports 20, etc.) along fluid channel 18, at least one of the multiple pressure sensors may be configured to sense pressures over a pressure sub-range different from a sub-range over which at least one other of the multiple pressure sensors at the location may be configured to sense pressure, but this is not required. In some cases, and as shown in FIG. 8, the various pressure sensors may be mounted directly to a corresponding circuit board, such that when the circuit board is mounted to the valve body 12, the pressure sensor is in fluid communication with a corresponding fluid port in the valve body 12.

In some instances, such arrangements of pressure sensors 38, 42, 43, 44 within valve assembly 10, along with the connection between valve controller 26 and pressure sensors 38, 42, 43, 44 may be used to emulate functions of high gas pressure (HGP) and low gas pressure (LGP) switches, which traditionally require wires and further housings extending to and from and/or attached to valve body 12. When the electronics and elements of valve assembly 10 are configured to emulate LGP/HGP switches, gas-valve wiring connections and interactions may be at least partially avoided, eliminated or simplified. In some instances, such configuration of valve controller 26 and pressure sensors 38, 42, 43, 44 may reduce manual operations (e.g., manually adjusting a mechanical spring or other device of conventional high gas pressure (HGP) and low gas pressure (LGP) switches), and allow for a more precise fitting with the electronics of valve assembly 10.

In some cases, pressure sensor assembly 24 may include one or more absolute pressure sensors 54 in communication with microcontroller 36. Absolute pressure sensor 54 may sense an atmospheric pressure adjacent gas valve assembly 10, and may be configured to communicate and transfer data related to the sensed atmospheric pressure to microcontroller 36. Microcontroller 36 may take into account the atmospheric pressure from the absolute pressure sensor 54 when determining the flow rate of fluid flowing through the characterized port and/or an estimate of fuel consumption by an attached appliance and/or when determining threshold values. Other sensors may be included in valve assembly 10, for example, one other type of sensor may be a barometric pressure sensor.

As discussed, valve assembly 10 and the flow module 28 thereof may include temperature sensor(s) 34, as seen in FIGS. 9-11. Temperature sensor 34 may be positioned within valve body 12 so as to be at least partially exposed to fluid channel 18 and configured to sense a temperature of a fluid (e.g., gas or liquid) flowing through fluid channel 18 and/or any other temperature in fluid channel 18. Temperature sensor 34 may have a first temperature sensor 34a at least partially exposed to fluid channel 18 upstream of a characterized valve port, and/or a second temperature sensor 34b at least partially exposed to fluid channel 18 downstream of the characterized valve port, as seen in FIGS. 9 and 10. When there is a first valve port and a second valve port (e.g., valve ports 20a, 20b), there may be a third temperature sensor 34c in fluid communication with intermediate volume 19 between the first and second characterized valve ports, if desired. The sensed temperature measure may be used by flow module 28 to, for example, compensate, correct, or modify a determined measure (e.g., a density of a fluid) that is related to, for example, a fluid flow rate of fluid flowing through fluid channel 18, which may help improve the accuracy of the flow rate calculation. In operation, temperature sensor 34 (e.g., any or all of temperatures sensors 34a, 34b, 34c) may communicate a sensed temperature measure directly or indirectly to valve controller 26 and/or a non-volatile memory 37 of valve controller 26 (e.g., memory in a microcontroller 36 or memory in another location) and/or flow module 28. Valve controller 26 may, in turn, utilize the sensed temperature to help increase the accuracy of a determined flow rate of fluid passing through a characterized port and/or increase the accuracy of a calculated fluid and/or fuel consumption quantity, as desired, and store the calculated flow rate of fluid passing through a characterized port and/or the calculated fluid and/or fuel consumption quantity in the non-volatile memory 37. Additionally, or in the alternative, in some instances pressure sensors 38, 42, 43, 44 may utilize built-in temperature sensors that are used to internally compensate the pressure sensor over the operating temperature range. In such instances, the temperature reading may be accessible at the pressure sensor output (e.g., a digital communication bus) or at another location.

Flow module 28 of valve assembly 10 may further include a position sensor system that may be configured to continuously or discontinuously sense at least one or more of an axial position, a rotary position, and/or a radial position, of valve sealing member 22 within or about fluid valve port 20. In some cases, position sensor system may include more than one position sensors 48, such that each position sensor 48 may monitor a sub-range of a valve's total travel. Moreover, position sensor system may be utilized as a proof of closure switch system. Position sensor(s) 48 of the position sensor system may be situated or positioned in valve body 12 at or about a valve port 20. For example, and in some instances, position sensor(s) 48 may be fluidly isolated from fluid channel 18 (e.g., fluidly isolated from fluid channel 18 by valve body 12), and radially spaced from an axis upon which a valve sealing member(s) 22 may axially and/or rotationally translate between a closed position and an open position, as seen in FIGS. 14-17.

An illustrative gas valve assembly 10 may include a first valve port 20a and a second valve port 20b (see FIG. 7), and a first position sensor 48a monitoring first valve sealing member 22a and a second position sensor 48b monitoring second valve sealing member 22b, where position sensors 48a, 48b may be separate devices or may share an enclosure and/or other parts. In the illustrative instance, the first position sensor 48a may be fluidly isolated from fluid channel 18 and radially spaced from a first axis of first valve port 20a, and the second position sensor 48b may be fluidly isolated from fluid channel 18 and radially spaced from a second axis of second valve port 20b (see FIGS. 14-17).

As discussed above, position sensor 48 may be configured to detect a measure that is related to whether valve sealing member 22 is in an open or closed position and/or a measure related to an intermediate position of valve sealing member 22 within fluid valve port 20. In one example, position sensor(s) 48 may be configured to provide a proof of closure (POC) sensor(s) for valve port(s) 20 (e.g., first valve port 20a and/or second valve port 20b).

Where valve sealing member(s) 22 have a range of travel (e.g., rotationally and/or axially) within valve port(s) 20, position sensor(s) 48 may be configured to sense a current position of valve sealing member(s) 22 anywhere along the range of travel of valve sealing member(s) 22. Position sensor 48 may then send (e.g., through electronic or other communication) sensed positioning data of the measure related to the position of valve sealing member 22 to determining block and/or microcontroller 36 and/or a non-volatile memory 37 of valve controller 26 and/or flow module 28, where microcontroller 36 may be configured to monitor the axial position of valve sealing member 22 within valve port 20 through position sensor system 48.

Figure 13:
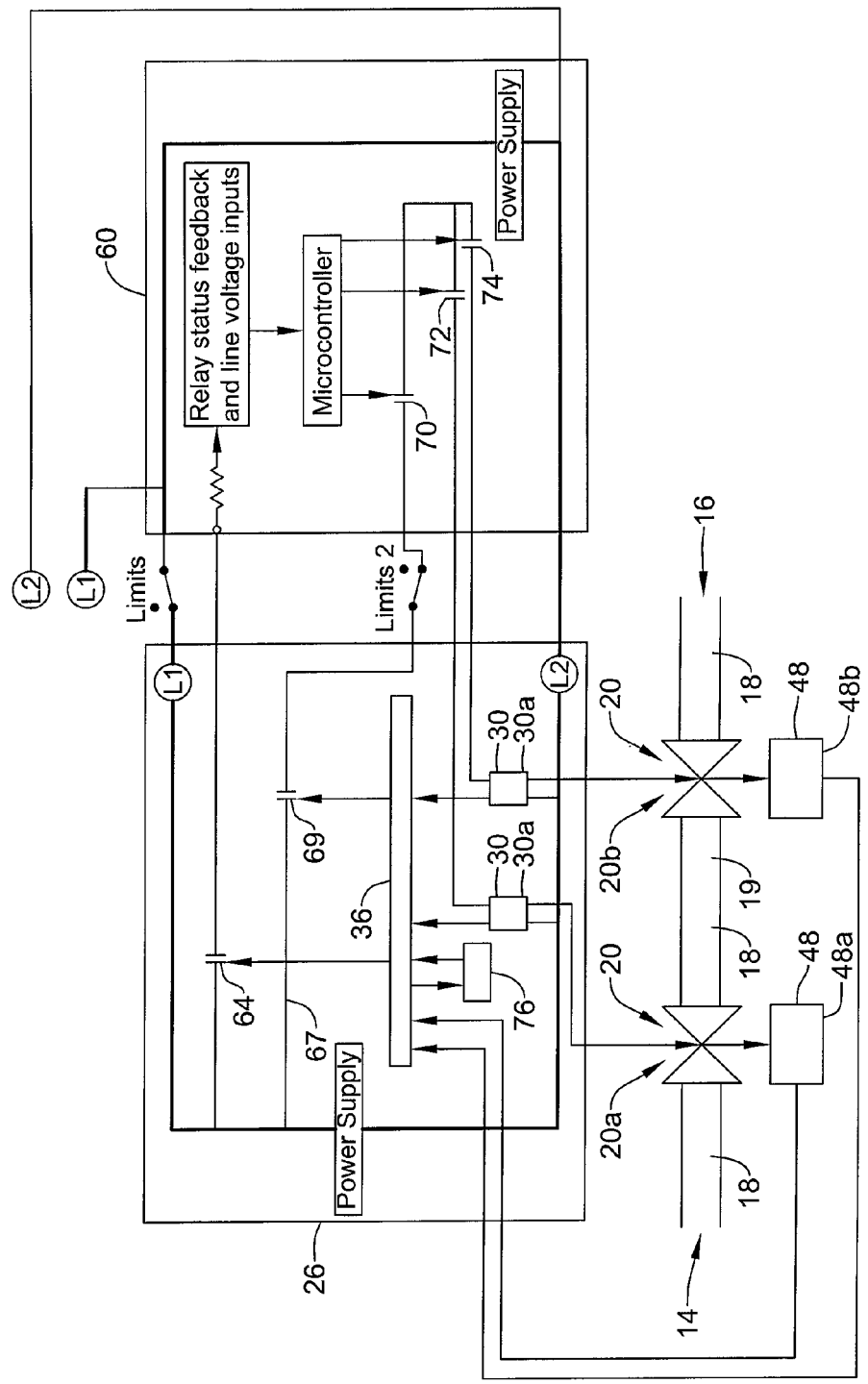
FIG. 13 is a schematic diagram showing an illustrative valve control and proof of closure system in conjunction with a combustion appliance.

In some instances, valve controller 26 may include an electronic circuit board and a wired or wireless communication link 100 may facilitate communication between position sensor(s) 48 and the electronic circuit board or other device of valve controller 26. Valve controller 26 may be configured to further pass on positioning information to remote devices through communication lines (e.g., communication link 100) and/or display positioning data of valve sealing member 22 on one or more displays 76 attached to valve assembly 10 and/or remote devices, as seen in FIG. 13. Valve controller 26 may indicate a closed or open position of valve sealing member 22 or a degree (e.g., 10%, 20%, 30%, etc.) of an opening of valve sealing member 22 with one or more visual indicators on or comprising display(s) 76, as seen in FIG. 13, such as one or more light emitting diodes (LEDs) acting as a visual indication of a valve state and/or position, liquid crystal displays (LCDs), a touch screen, other user interfaces and/or any other display interfacing with or displaying information to a user.

In some instances, the position sensor system may include one or more switches 64 (e.g., a first switch 64a and a second switch 64b, where switch(es) 64 may be or may include relays or other switch types such as FETs, TRIACS, etc.) having one or more switched signal paths 66 and one or more control inputs 68 (e.g., a first control input 68a and a second control input 68b), as seen in FIG. 13. Illustratively, one switch 64 may be utilized for multiple position sensors 48, or more than one switch 64 may be utilized for multiple position sensors (e.g., in a 1-1 manner or other manner), as desired. Control input 68 may set the state of switched signal paths 66 to a first state or a second state or another state, as desired. As depicted in FIG. 13, valve controller 26 may be coupled to position sensor(s) 48, and may control input 68 of switch 64, where both valve controller 26 and position sensors 48 may be isolated from fluid communication with fluid channel 18. In some instances, valve controller 26 may be configured to set the state of switched signal path 66 to the first state when first position sensor 48a senses that a first valve port 20a is not closed or first valve sealing member 22a is not in a closed position, and to a second state when position sensor 48 senses that a first valve port 20a is closed or first valve sealing member 22a is in a closed position. Similarly, valve controller 26 may be configured to set the state of switched signal path 66 to the first state when second sensor 48b senses that second valve port 20b is not closed or second valve sealing member 22b is not in a closed position, and to a second state when position sensor 48 senses that a second valve port 20b is closed or second valve sealing member 22b is in a closed position. In the alternative, valve controller 26 may be configured to set the state of switched signal path 66 to the first state when at least one of the first and second sensors valve ports 20a, 20b are not closed or at least one of the first and second valve sealing members 22a, 22b are not in a closed position, and to a second state when position sensor 48 senses that both first and second valve ports 20a, 20b are closed or both first and second valve sealing members 22a, 22b are in closed positions. Similar or identical or different processes, as desired, may be utilized for each position switch 64 and control input 68.

Figure 14:
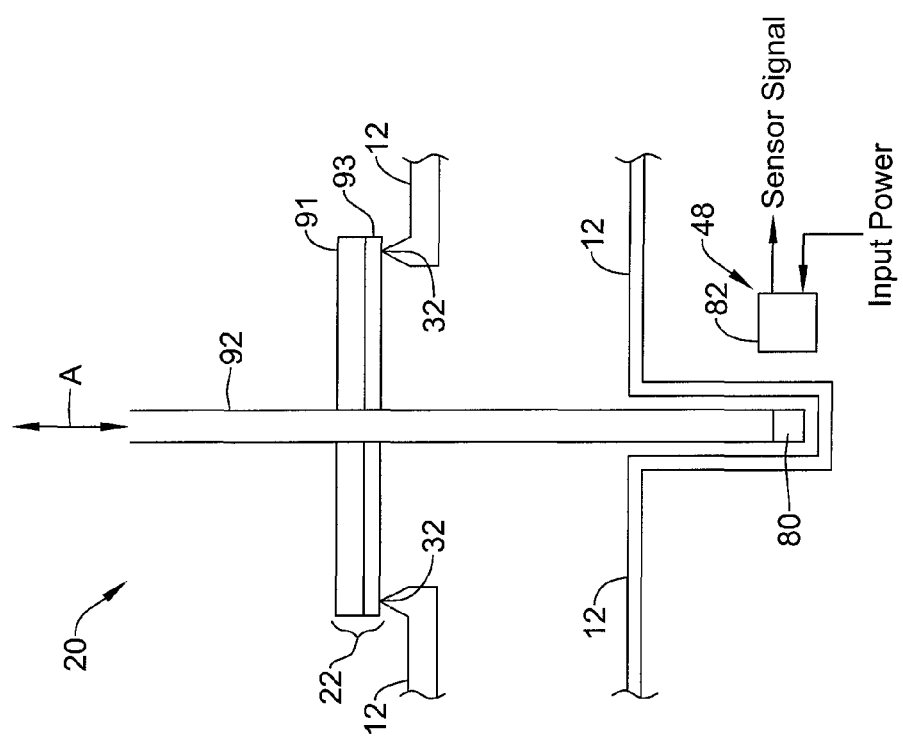
FIGS. 14-17 are various illustrative schematic depictions of different methods for sensing a position and/or state of a valve within an illustrative valve assembly.
Figure 15:
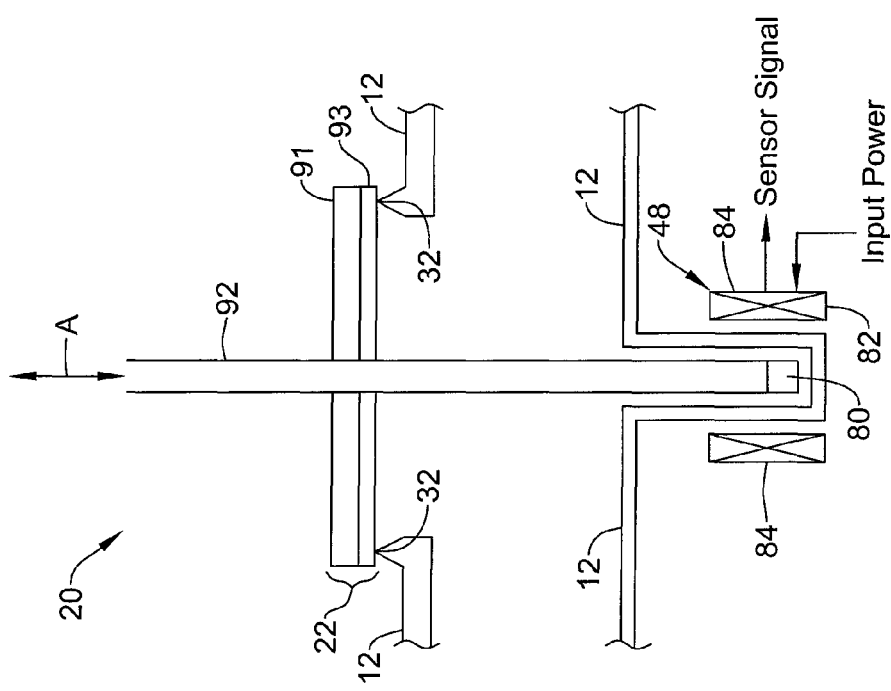

Illustratively, valve sealing member(s) 22 may include a sensor element 80, and position sensor(s) 48 may include one or more transducer or field sensors 82. For example, valve sealing member(s) 22 may include a sensor element 80 (e.g., a magnet when using a field sensor 82, a ferrous core when using a linear variable differential transformer (LVDT) 84, or other sense element, and/or similar or dissimilar indicators) secured relative to and translatable with valve sealing member(s) 22. Position sensor(s) 48 may include one or more field sensors 82 (e.g., magnetic field sensors, a LVDT 84, Hall Effect sensors or other similar or dissimilar sensors), as seen in FIGS. 14-15. Field sensor 82 may be positioned within valve body 12 or may be positioned exterior to valve body 12 and radially spaced from a longitudinal axis of valve port(s) 20 and/or valve sealing member(s) 22. Position sensor(s) 48 may be positioned so as to be entirely exterior to fluid channel 18. The meaning of entirely exterior of fluid channel 18 may include all position sensors 48 and all electronics (e.g., wires, circuit boards) connected to position sensor(s) 48 being exterior to fluid channel 18. Where position sensor(s) 48 includes an LVDT, the LVDT may be positioned concentrically around and radially spaced from valve sealing member(s) 22, as shown in FIG. 15, and/or the axis of LVDT may be spaced radially and parallel from the valve sealing members 22.

Figure 16:
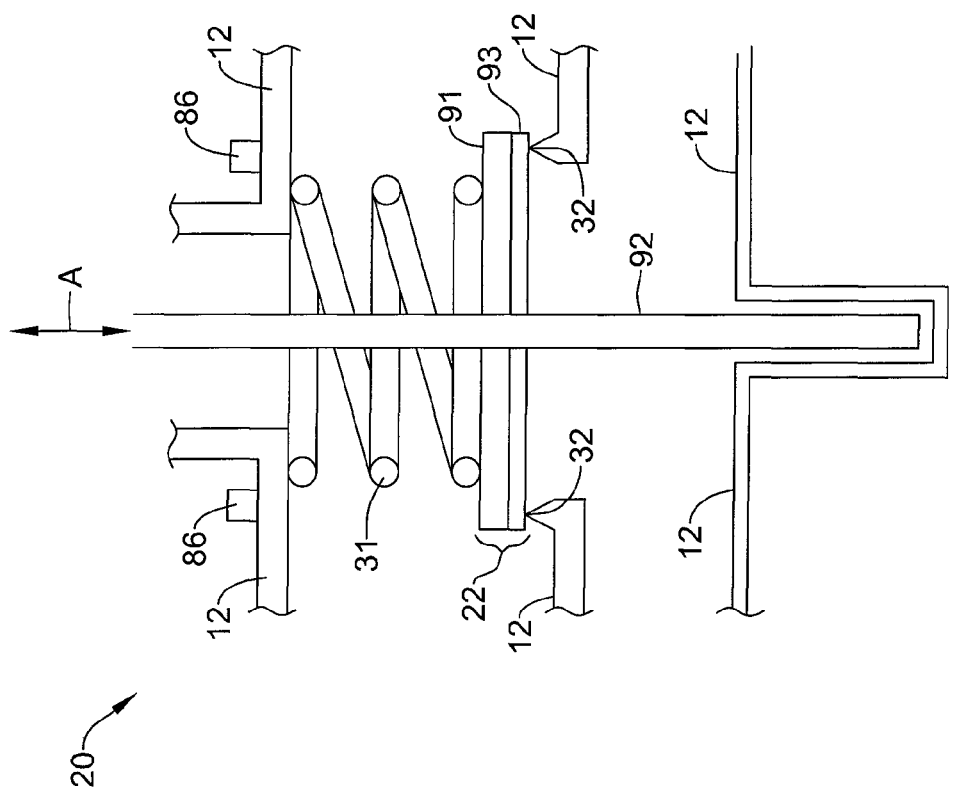
Figure 17:
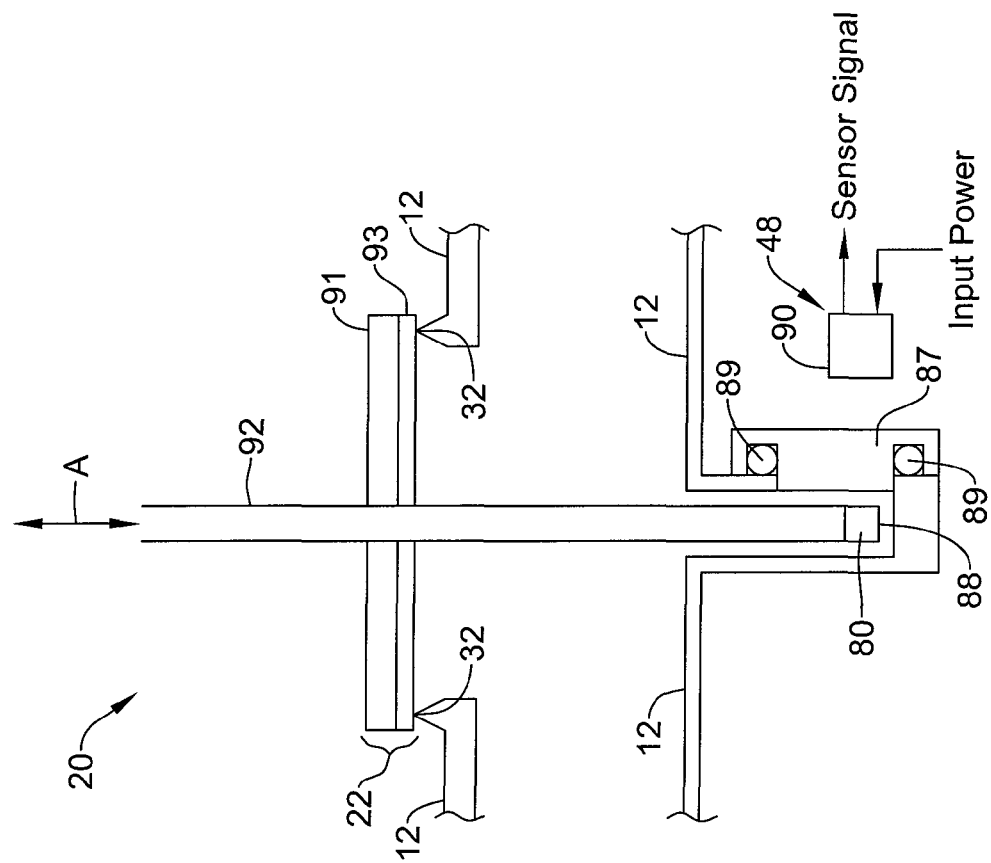

In some cases, a strain gauge 86, as depicted in FIG. 16, or other electromechanical sensor may also be utilized to sense a position of valve sealing member 22 within an interior of fluid channel 18 from a position fluidly exterior of fluid channel 18 by sensing a strain level applied by spring 31 in communication with valve sealing member 22. Alternatively, or in addition, valve sealing member(s) 22 may include one or more visual indicators 88 (e.g., a light reflector or other visual indicators), and position sensor(s) 48 may include one or more optical sensors 90, as seen in FIG. 17, where visual indicators may be any indicators configured to be viewed by optical sensors through a transparent window 87 sealed with an o-ring or seal 89 or through another configuration, such that optical sensors 90 may determine at least whether valve sealing member(s) 22 is/are in a closed or open position. Where a visual position indicator 88 is utilized, and in some cases, a user may be able to visually determine when valve sealing member(s) 22 is not in a closed position.

As may be inferred from the disclosure, position sensor 48 may in some instances operate by detecting a position of a valve sealing member 22 and/or optionally valve stem 92 or the like within a valve assembly 10 having a valve body 12, where valve sealing member 22 may be translatable with respect to valve port 20 of valve body 12 along a translation or longitudinal axis "A" within a valve port 20. In some cases, sensor element 80, affixed relative to valve sealing member 22, may be positioned within the interior of valve body 12 and may optionally fluidly communicate with fluid channel 18; however, position sensor 48 may be isolated from fluid channel 18 and/or positioned exterior to valve body 12. In an illustrative embodiment, valve sealing member 22 may be positioned at a first position within an interior of valve port 20 along translation axis A. The first position of the valve sealing member 22 may be sensed with position sensor 48 by sensing a location of a sensor element 80 secured relative to valve sealing member 22 with position sensor 48. Then, position sensor 48 may automatically or upon request and/or continuously or discontinuously, send the sensed location and/or open or closed state of valve sealing member 22 to the valve controller 26.

It is contemplated that valve controller 26 may electronically calibrate the closed position of valve sealing member 22 and/or valve stem 92. Such a calibration may store the position of the valve sealing member 22 and/or valve stem 92 when the valve sealing member 22 and/or valve stem 92 is in a known closed position (e.g. such as during installation of the valve assembly 10). During subsequent operation, the position of the valve sealing member 22 and/or valve stem 92 can be compared to the stored position to determine if the valve sealing member 22 and/or valve stem 92 is in the closed position. A similar approach may be used to electronically calibrate other positions of the valve sealing member 22 and/or valve stem 92 (e.g. fully open position, or some intermediate position), as desired.

Fuel Rate Monitor

In operation, valve assembly 10 may be utilized to measure a flow rate of fluid flowing through a characterized port (e.g., valve port 20 or other port). As discussed above, the measuring method may include utilizing a microcontroller 36 or the like to monitor (e.g., monitoring sensed measures, monitoring control signals, set-points, and user settings, etc.) a differential pressure across a characterized valve port which may be continuously or discontinuously monitored by pressure sensor assembly 24, monitoring (e.g., monitoring sensed/feedback measures, monitoring control signals, set-points and user settings, etc.) a position of a valve sealing member 22 within the characterized valve port which may be continuously or discontinuously monitored by position sensor 48, and/or determining a flow rate of the fluid flowing through the characterized port with the microcontroller 36 from the monitored differential pressure, and in some cases, the monitored position of the valve sealing member 22.

To facilitate determining the flow rate of fluid flowing through the characterized port, microcontroller 36 may utilize a valve's opening curves stored in a memory 37. In some cases, the characterized port may be characterized at various flow rates, across various open positions, to identify a relationship between a measured pressure drop across the characterized port and the flow rate through the gas valve. Of course, when the valve only switches between a fully closed position and a fully open position, the characterized port need not be characterized over various open positions; just over the fully open position. In some cases, the relationship may be stored in a non-volatile memory 37 of the gas valve assembly 10.

Through the use of valve opening curves and/or other similar or different data and/or algorithms, microcontroller 36 may determine a flow rate for any combination of sensed pressure drop and sensed valve sealing member 22 positions. As further detailed herein, it is contemplated that temperature, atmospheric pressure, inlet pressure, outlet pressure and/or other sensed parameters may be used to help increase the accuracy of the determined flow rate, if desired.

Microcontroller 36 may be configured to continuously monitor the differential pressure across the characterized port, and in some cases continuously monitor the position of the valve sealing member 22, in such a manner as to be configured to continuously determine the flow rate of the fluid flowing through the valve port. Continuously monitoring the differential pressure(s) and in some cases the positioning of the valve sealing member 22, and continuously determining the flow rate of fluid flowing through the characterized port, may facilitate the microcontroller 36 continuously tracking, reporting, and/or outputting an instantaneous flow rate of the fluid flowing through the characterized port and/or to continuously tracking, reporting, and outputting a cumulative flow volume of the fluid (integral of the flow rate over time) flowing through the characterized port over a given period of time. An average flow rate of fluid flowing through the characterized port may be determined from the instantaneous flow rates of the fluid over time. In addition, microcontroller 36 may send one or more of the tracked and reported instantaneous flow rates and/or the cumulative flow volume from microcontroller 36 to a system controller 50 and/or an appliance controller 60 via a communication link 100, if desired, and the reported instantaneous flow rates and/or the cumulative flow volume and/or other data may be read out at the local valve controller display 76, appliance display 62 and/or system display 52.

In addition to taking into consideration differential pressure across a characterized port, and in some cases the positioning of valve sealing member 22 (e.g. when intermediate open positions are used), microcontroller 36 may consider measures from one or more other sensors that sense characteristics within or about fluid channel 18 or other resources. For example, microcontroller 36 may consider one or more measures related to a temperature in fluid channel 18 sensed by temperature sensor(s) 34 (e.g., temperature may be used to correct/calculate a fluid flow rate), one or more measures related to an absolute pressure about fluid channel 18 sensed by an absolute pressure sensor 54 (e.g., absolute pressure may be used to correct/calculate flow rate of a fluid), and/or other measures sensed by other sensors or received from other sources, as desired.

It is also contemplated that microcontroller 36 may take into consideration the altitude of the fluid channel 18 with respect to sea level or another baseline measure when determining a flow rate of fluid through fluid channel 18. Altitude may be continuously or discontinuously sensed by an altimeter on or adjacent or remotely located from valve assembly 10 and/or an altitude may be preset within microcontroller 36 or entered at any time prior to or during or after installation of the valve assembly 10. Also, it is contemplated that a Wobbe index associated with the fluid flowing through fluid channel 18 may be stored and utilized. Utilization of a Wobbe index may facilitate reporting out of fluid flow rates through fluid channel 18 by microcontroller 36 in units of energy per time (e.g., BTU/hour for indicating fuel consumption), rather than reporting a volumetric or mass flow measure. Such consideration of further characteristics (including characteristics not listed) related to fluid channel 18 may allow for determining more accurate flow rate measures of the fluid flowing through fluid channel 18, as the utilizing of further characteristics may have the ability to reduce assumptions in known flow equations/algorithms utilized by microcontroller 36.

Electronic Cycle Counting

In operation, gas valve assembly 10 may monitor the number of operational valve cycles experienced by one or more valve sealing member 22 over a period of time (such as the lifetime of gas valve assembly 10). In one example, valve controller 26 of valve assembly 10 may monitor a valve sealing member 22 of at least one of the valve ports 20 being opened from a closed position and/or being returned to the closed position to complete an operational cycle, where a plurality of operational cycles may be completed during the lifetime of the valve assembly 10. In one example, a count of the number of operational cycles may be maintained and/or stored in a non-volatile memory 37, or other memory, of valve controller 26 (e.g., microcontroller 36 or other device) of valve assembly 10 in a tamper proof manner. Alternatively, and to detect an operation cycle, valve controller 26 of valve assembly 10 may monitor a valve sealing member 22 moving from an open position to a closed position and back to an open position, or any other cycle involving movement of valve sealing member 22 and/or other parts, portions or devices of valve assembly 10. In some cases, valve controller 26 may monitor valve actuators 30, positions of valve sealing member 22 and/or signals to valve actuators 30, and/or other indicators to monitor the number of operational valve cycles experienced by each valve port 20 over a period of time, such as the lifetime of valve assembly 10.

The memory (e.g., non-volatile memory 37) of valve controller 26 storing the electronic operational valve cycle counting system may also be programmed with one or more number of cycles for which valve assembly 10 may be rated (e.g., one or more threshold numbers of operational valve cycles). Valve controller 26 may be configured to retrieve the one or more threshold numbers of operational valve cycles from the non-volatile memory 37, and compare the count of the number of operational valve cycles to the one or more threshold numbers of operational valve cycles. If desired, valve assembly 10 may be configured to take action if a counted number of cycles meets and/or exceeds one of the one or more threshold numbers of valve cycles. Taking action may include, for example, after a first threshold number of operational cycles has been surpassed, initiating a warning or an alarm 78 or sending for a maintenance call, and after a second threshold number of operational cycles has been surpassed, shutting the system down by removing power from main valve switches 72, 74, preventing valve actuator(s) 30 from selectively moving valve sealing member(s) 22 (e.g., preventing the opening of valve port(s) 20), and/or any other desired action.

As the operational valve cycle data may be electronically stored in memory (e.g., non-volatile memory 37) of microcontroller 36, the valve cycle data (e.g., a total number of operational cycles, etc.) may be communicated and/or outputted to one or more remote devices, such as system controller 50 and/or appliance controller 60, via a wired or wireless communication interface including or connected to a bus or link 100 or other link, where the operational valve cycle data (e.g., total number of operational cycles, etc.) may be displayed on displays 52, 62 or other display interfaces. Alternatively, or in addition, the operational valve cycle data may be displayed on a handheld device and/or a display at or adjacent valve assembly 10 (e.g., a touch-screen on valve body 12) or on another display or device, as desired.

In addition, microcontroller 36 may be configured to continuously or discontinuously monitor and/or analyze the duration and number of cycles, time between half cycles (time between the open and closing of the valve), and/or other parameters to help determine any abnormal patterns that would be indicative of system or component malfunction and/or failures, and/or other normal or abnormal patterns. In some further illustrative instances, the electronic counter may take the place of an electronic clock on the system, such that the operational cycle count may be utilized as a digital time stamp when storing information on various events detected by valve controller 26, such as diagnostic, warning and/or error messages and the like.

Overpressure Diagnostics

Valve assembly 10 may be configured to detect, report, and/or automatically act upon an overpressure event occurrence at, within, and/or on valve assembly 10. An overpressure event may be an event where pressure at the input port 14, output port 16, or within fluid channel 18 of valve assembly 10 is greater than an overpressure threshold value (e.g., a valve pressure rating value, a pressure value below which the specifications of the valve assembly 10 are guaranteed, a pressure value below which it is guaranteed no damage will occur to the valve assembly 10 from pressure, a pressure value between the pressure value below which the specification of valve assembly 10 is guaranteed and the pressure value below which it is guaranteed no damage will occur to the valve assembly 10 from pressure, etc.), where the overpressure may cause damage to the valve assembly 10. Acting on such sensed overpressure events may, for example, take a valve offline until the valve can be inspected, enable more accurate system diagnostics under some circumstances, optimize maintenance scheduling, minimizing service and down time, and/or increasing safety levels with respect to valve assembly 10. These are just some examples.

The overpressure threshold value may be related to a valve pressure rating value of valve assembly 10 and/or valve ports 20 therein. The overpressure threshold value may be substantially equal to or less than or greater than the valve pressure rating value of valve assembly 10. A valve pressure rating value may be any pressure value assigned to valve assembly 10. For example, a valve pressure rating value may be equal to or less than a pressure value at which valve assembly 10 or valve ports 20 within valve assembly 10 is or are expected to fail or become otherwise damaged.

Similarly, a pressure sensor 38, 42, 43, 44 of pressure sensor assembly 24, which may continuously monitor pressure levels of fluid flowing through fluid channel 18, may have a sensor pressure rating value. In an illustrative instance, the sensor pressure rating value of at least one of the pressure sensors 38, 42, 43, 44 may be equal to or substantially greater than the valve pressure rating of valve assembly 10. In some cases, there may be multiple overpressure threshold values, which may indicate different levels of severity of an overpressure event, and/or may be useful for other purposes or may indicate different thresholds at different locations along the fluid channel 18 (e.g., at the input and output of fluid channel 18) where pressure levels are being sensed and/or monitored.

Valve controller 26 of valve assembly 10 may be utilized to facilitate overpressure diagnostics. Valve controller 26, which may be secured relative to valve body 12 and in communication with pressure sensor assembly 24, may be configured to compare a measure related to a sensed pressure of fluid (e.g., fuel, etc.) flowing through fluid channel 18 of valve body 12 with an overpressure threshold value stored in non-volatile memory 37 or other memory accessible by valve controller 26. The sensed pressure may be sensed by pressure sensor assembly 24 at any position along fluid channel or path 18; for example, a pressure may be sensed upstream of one or more valve port(s) 20 (e.g., first and/or second valve port 20a, 20b) or downstream of one or more valve port 20 (e.g., first and/or second valve port 20a, 20b) or if there are two or more valve ports 20 (e.g., first valve port 20a and second valve port 20b), then in between, upstream or downstream valve ports 20. Pressure sensor assembly 24 may be configured to utilize one or more pressure sensors 38, 42, 43, 44 that may facilitate continuously sensing a pressure in fluid channel 18 at one or more desired locations (e.g., upstream of a first valve port 20a) and then automatically and repeatedly, or continuously, communicate the sensed pressure at the desired location(s) to valve controller 26.

Valve controller 26 may be configured to determine if the measure related to the sensed pressure exceeds or surpasses the overpressure threshold value. If the measure does surpass the overpressure threshold value, the valve controller 26 may be configured to provide a predetermined output signal indicating that an over pressure event has occurred. The predetermined output signal may be provided to a remote device (e.g. 50 or 60) and/or an audible and/or visual alarm may be displayed on a remote display (e.g., 52, 62) or a display located adjacent and/or on valve assembly 10. Alternatively, or in addition, the predetermined output signal may, indirectly or directly, cause valve actuator(s) 30 to close valve port(s) 20 (e.g., by closing valve sealing member(s) 22 therein) and/or cause valve controller 26 to store the over pressure event in a non-volatile memory 37 or other memory of valve controller 26 and/or other device. The predetermined output signal may also, indirectly or directly, cause valve controller 26 to store one or more of a time stamp of the overpressure event, a level of the sensed pressure causing the overpressure event, a duration of the overpressure event, a cumulative number of overpressure events, classification identifier of the overpressure event, any parameter calculated from a series of measured pressure readings, and/or other related or unrelated data.

The stored data or information related to the overpressure events may be processed and/or analyzed by valve controller 26 and/or transferred to other devices. Processing the stored information may include, but is not limited to, determining a most likely cause of an over pressure event, classifying the event by most likely cause, estimating the severity of the event, calculating the cumulative number of over pressure events, comparing any of the stored information (e.g., level of the sensed pressure causing the event, time stamp of an event, duration of an event, number of events, severity of an event, etc.), which may be stored in valve controller 26, to one or more threshold values that may also be stored in valve controller 26 or at one or more other locations, notifying a user by visual or audible means or alarm, running self checking diagnostics to evaluate key performance characteristics (e.g., seat leakage testing through a VPS test, regulator performance etc.), indirectly or directly closing valve port(s) 20 via valve actuator(s) 30, and/or sending a signal to trigger some system level overpressure counter-measure in response to a measure surpassing a respective threshold value. Additionally, all or some or none of the actions and/or results of the processing may be communicated to users or other devices over communication link 100, an I/O interface, and/or any other communication mechanism.

High Gas Pressure and Low Gas Pressure Detection

Valve assembly 10 may be configured to monitor the occurrence of pressure events along a fluid channel 18. Valve assembly 10 may be configured as an electronic module for detecting low gas pressure (LGP) upstream of first valve port 20a and high gas pressure (HGP) downstream of the first valve port 20a and/or second valve port 20b or another valve port 20 depending on which valve port 20 is the most downstream valve port 20 in valve assembly 10. By placing a pressure sensor 42 upstream of the first valve port 20 to sense an inlet gas pressure and/or placing a pressure sensor 42 downstream of the second valve port 20 to sense an outlet gas pressure and/or placing a pressure sensor 42 in an intermediate volume 19 between a first valve port 20a and a second valve port 20b to sense an intermediate volume gas pressure, the electronics of valve assembly 10 may be configured to electronically emulate and/or perform electromechanical or mechanical HGP/LGP switch functions, such that the functions of electromechanical or mechanical HGP/LGP switches may be directly integrated in valve assembly 10. At a minimum, a single pressure sensor is needed to perform both HGP/LGP switch functions in accordance with this disclosure. The integration of the switch functions may facilitate internalizing wiring connections within valve body 12, and may result in size and cost savings due, at least in part, to valve and switch functions sharing a common housing, while providing other solutions and benefits as would be generally realized.

In an illustrative instance, one or more first pressure sensors 42, positioned upstream of first valve port 20a, may continuously or discontinuously sense an inlet pressure in fluid channel 18 and may be in communication with valve controller 26. Valve controller 26 may be configured to continuously or discontinuously compare a first measure (e.g., inlet pressure) or data related thereto, which may be stored in memory (e.g., non-volatile memory 37) of valve controller 26, that at least tracks a measure related to a sensed pressure sensed by the one or more first pressure sensors 42 in valve body 12 upstream of first valve port 20a, with a first pressure threshold programmed into and stored in memory (e.g., non-volatile memory 37) of valve controller 26. Valve controller 26 may then provide a predetermined first output signal if the first measure surpasses the first pressure threshold, where the first output signal may result in first valve actuator 30a closing first valve port 20a and second valve actuator 30b closing second valve port 20b.

In an illustrative example, valve controller 26 may compare the first measure to a low gas pressure threshold (e.g., a first pressure threshold) and if the first measure drops below or is less than the low gas pressure threshold, the first measure may be said to have surpassed the low pressure threshold, and valve controller 26 may provide the predetermined first output signal. Alternatively, or in addition, valve controller 26 may be configured to compare the first measure with a second pressure threshold (e.g., a high gas pressure threshold) programmed into and stored in valve controller 26, where valve controller 26 may be configured to provide a predetermined second output signal if the first measure surpasses the second pressure threshold (e.g., if the first measure is greater than or more than the high pressure threshold). The first and second pressure thresholds may be automatically, manually through a user interface, locally (e.g., on a valve assembly's 10 own display/user interface 76), and/or remotely (e.g., via an appliance or system level display 52, 62 and communication bus 100) determined and programmed during setup. In some cases, the first and second pressure thresholds may be selectable from the American National Standards Institute (ANSI) standards and/or European (EN) standards. For example, a first or high gas pressure threshold may be 125% of a first pressure run and a second or low gas pressure threshold may be 75% of a first pressure run. The predetermined first and second pressure output signal may indicate a pressure event has occurred and/or other data or information related to the pressure event.

Likewise, one or more second pressure sensors 43 positioned downstream of first valve port 20a and/or second valve port 20b may continuously or discontinuously sense outlet pressures in fluid channel 18 and may be in communication with valve controller 26. Valve controller 26 may be configured to continuously or discontinuously compare a second measure (e.g., outlet pressure) or data related thereto, which may be stored in memory (e.g., non-volatile memory 37) of valve controller 26, that at least tracks a sensed pressure in valve body 12 downstream of second valve port 20b with a third pressure threshold or other pressure threshold programmed into and stored in memory (e.g., non-volatile memory 37) of valve controller 26. Valve controller 26 may then provide a predetermined third output signal if the second measure surpasses the third pressure threshold, where the third output signal may result in first valve actuator 30a closing first valve port 20a and second valve actuator 30b closing second valve port 20b.

In an illustrative example, valve controller 26 may compare the second measure to a high gas pressure threshold and if the second measure rises above the high gas pressure threshold, the second measure may be said to have surpassed the high gas pressure threshold and valve controller 26 may provide the predetermined third output signal. Alternatively, or in addition, valve controller 26 may be configured to compare the second measure with a fourth pressure threshold (e.g., a low pressure threshold), or other pressure threshold, programmed into and stored in valve controller 26, where valve controller 26 may be configured to provide a predetermined fourth output signal if the second measure surpasses the fourth pressure threshold. The predetermined third and fourth output signals may indicate a pressure event has occurred and/or other data or information related to the pressure event.

In a similar manner, one or more third pressure sensors 44 positioned downstream of first valve port 20a and upstream of second valve port 20b may continuously or discontinuously sense an intermediate pressure, or a measure related thereto, in intermediate volume 19 of fluid channel 18 and may be in communication with valve controller 26. Valve controller 26 may be configured to continuously or discontinuously compare a third measure (e.g., intermediate pressure) or data related thereto, which may be stored in memory (e.g., non-volatile memory 37) of valve controller 26 with a fifth pressure threshold or other pressure threshold programmed into and stored in memory (e.g., non-volatile memory 37) of valve controller 26. Valve controller 26 may then provide a predetermined fifth output signal if the third measure surpasses the fifth pressure threshold, where the fifth output signal may result in first valve actuator 30a closing first valve port 20a and second valve actuator 30b closing second valve port 20b.

In an illustrative example, valve controller 26 may compare the third measure to a high gas pressure threshold and if the third measure rises above the high gas pressure threshold, valve controller 26 may provide the predetermined fifth output signal. Alternatively, or in addition, valve controller 26 may be configured to compare the third measure with a sixth pressure threshold (e.g. a low pressure threshold), or other pressure threshold, programmed into and stored in valve controller 26, where valve controller 26 may be configured to provide a predetermined sixth output signal if the third measure surpasses the sixth pressure threshold. The predetermined fifth and sixth output signals may indicate a pressure event has occurred and/or other data or information related to the pressure event.

As discussed above, the HGP/LGP testing may be performed with one or more pressure sensors. The numbering and positioning of the pressure sensors (e.g., first pressure sensor 42—upstream, second pressure sensor 43—downstream, third pressure sensor 44—intermediate, etc.) is for illustrative purposes only. For example, there may be a single pressure sensor in valve assembly 10, where the single pressure sensor is located upstream of the valve port(s) 20, downstream of the valve port(s) 20 or intermediate the valve ports 20. Further, each pressure sensor 38, 42, 43, 44 included in valve assembly 10 may be associated with one or more pressure threshold value and those one or more pressure threshold values may be similar to or different from one or more pressure threshold values associated with any other pressure sensor.

Valve controller 26 may include software to effect methods of operation disclosed herein. In some illustrative instances, software filtering techniques may be utilized to eliminate transient pressure readings from causing a false opening of a switch 69 in the limit string 67, for example, a switch in series with safety switch 70, which may help prevent nuisance valve port(s) 20 closures. Safety switch 70 may be wired in series between main valve switches 72, 74 and the limit string 67, for example. In such a configuration, if valve controller 26 detects a pressure event, valve controller 26 may initiate a series of actions resulting in a switch 69 in the limit string 67 opening, which may remove power from main valve switches 72, 74, resulting in valve ports 20 closing. The software may help improve robustness of the system by allowing the software to be intelligent about when it monitors the sensor states and what action is taken in response.

As the functions of HGP/LGP switches may now be emulated by sensors and electronics, and the output may no longer only be a simple "switch open" or "switch closed", but rather, in addition or alternatively, an actual readable pressure value or value related thereto, it may be advantageous to configure valve controller 26 to communicate this data to a remote device (e.g., a building automation system or system controller 50, an appliance controller 60, etc.) or display 52, 62. System display 52 or appliance display 62 may be configured to show threshold pressures along with actual sensed pressures during operation to show a user how much margin there is until a pressure event trip point. In addition, valve controller 26 may be configured to communicate to system controller 50 or appliance controller 60 that a pressure event has occurred, which may result in an indicator being displayed on displays 52, 62. Such communication may take place over a wired or wireless bus or link 100, where the bus may be configured to carry data to and from valve assembly 10. In some cases, low and high pressure thresholds may be inputted by an operator of valve assembly 10 and may be downloaded or otherwise programmed into valve controller 26.

Note, first, second, third, fourth, fifth and sixth pressure thresholds and output signals are merely some illustrative examples, and there may be any number of pressure thresholds and output signals with respect to each provided pressure sensor 42, 43, 44 (or 38), as desired. Further, with respect to a first and second pressure threshold related to a single valve port 20 and/or pressure sensor 42, 43, 44 (or 38), one of the first or second pressure threshold may relate to a high or low pressure threshold and the other pressure threshold may relate to the other of the high and low pressure thresholds. In addition, each of the one or more first pressure sensors 42, each of the one or more second pressure sensors 43 and each of the third pressure sensors 44, respectively, may include pressure sensors each having different or the same pressure sub-ranges. For example, where two third pressure sensors 44 are positioned downstream of the first valve port 20a and upstream of second valve port 20b, one of the two third pressure sensors 44 may have a first pressure sensing sub-range over which it may sense pressures and the other of the two third pressure sensors 44 may have a second pressure sensing sub-range over which it may sense pressures, but this is not required.

Although valve controller 26 may be configured to provide the above-mentioned first, second, third, fourth, fifth, and/or sixth output signals when the first, second, or third sensed measure related to each valve port 20 surpasses one of the pressure threshold stored in valve controller 26 to indicate a pressure event has occurred, valve controller 26 may be configured to not provide the predetermined first, second, third, fourth, fifth, or sixth output signal during at least one time period, even if any of the first, second, or third measures surpass a respective pressure threshold. For example, valve controller 26 may be programmed to not provide the predetermined output signal where the one time period is associated with a status of the first and/or second valve actuators 30a, 30b (e.g., at or around when the first and/or second valve actuator 30a, 30b are being actuated, etc.). Actuating the first and/or second valve actuator 30a, 30b may cause pressure transients, which could result in false HGP or LGP events. In some, but not all cases, for example, microcontroller 36 may be taught to ignore sensed pressures when valve port(s) 20 is/are closed, as the outlet pressure may be close to zero and likely below any threshold value and a sensed pressure in the intermediate volume 19 may be in a range from around zero to the inlet pressure.

Although typical safety valve assemblies may have sensed HGP downstream of a second valve port 20b and LGP upstream of a first valve port 20a, utilizing sensors of pressure sensor assembly 24 may allow pressure to be monitored at a single pressure sensor positioned at a single location (e.g. upstream of the first valve, intermediate the first and second valves, or downstream of the second valve) in or about valve assembly 10. Further, the microcontroller 36 onboard the valve assembly 10 may allow the valve controller 26 to assess when the combustion appliance is on and when it is off and in which state (e.g. open/closed) the valve sealing members 22 are positioned. Furthermore, it is possible to observe with one or more pressure sensors both HGP and LGP states upstream, downstream, and/or intermediate valve port(s) 20. As discussed, a single pressure sensor may be located at any position within or about valve assembly 10, such that the pressure sensor may be in fluid communication with fluid channel 18. A single pressure sensor configuration for detecting HGP and LGP may be facilitated by having microprocessor 36 observing sensed data for both low and high pressure conditions simultaneously. In one example, a single pressure sensor intermediate the first valve port 20a and the second valve port 20b, may monitor for both HGP and LGP events in the gas stream provided to the gas valve assembly 10. In the example, the single pressure sensor intermediate the first valve port 20a and the second valve port 20b may monitor for both HGP and LGP events whenever at least the first valve port 20a is open.

Valve Proving System Test

Valve controller 26 may be configured to perform an electronic valve proving system (VPS) test on valve assembly 10, where all or substantially all of the structure required for the VPS may be integrated directly into valve assembly 10. When so provided, the direct integration may allow sensors and electronics needed for VPS testing to share a common housing. Valve assembly 10 may be in communication with combustion appliance controller 60 or other device, and may at least partially control a fuel flow to a combustion appliance through fluid channel 18. Illustratively, the combustion appliance may cycle on and off during a sequence of operational cycles, where at least some of the operational cycles may include performing a VPS test prior to and/or after igniting received fuel during the corresponding operational cycle. For example, VPS tests may be performed on each valve port 20 prior to igniting received fuel during a corresponding operational cycle, VPS tests may be performed on each valve port 20 after a call for heat is satisfied (e.g., at the very end of an operational cycle), or a VPS test may be performed on a first valve port 20 prior to igniting received fuel during a corresponding operational cycle and on a second valve port 20 after a call for heat is satisfied. Due to the timing of the VPS test before and/or after operational cycles, or both, the test may be achieved in an amount of time consistent with the useful operation of an individual appliance (e.g., a short amount of time of 10-15 seconds or 5-30 seconds or a longer amount of time) depending on the inlet pressure, size of the intermediate volume 19, volume of the appliance combustion chamber, length of time of the appliance pre-purge cycle, firing rate of the appliance burner, the leakage threshold level, etc. The VPS test may be an automated process that occurs every, or at least some, operational cycle(s) (e.g., once the VPS test has been set up by a field installer or at the original equipment manufacturer, the testing may not require the end user to participate in any way).

The structural set up of valve assembly 10 for a VPS test may include valve controller 26 in communication with a pressure sensor 44 that may be in fluid communication with intermediate volume 19 between two valve ports (e.g., first valve port 20a and second valve port 20b, as seen in FIG. 8). Where valve controller 26 is in communication with pressure sensor 44, valve controller 26 may be configured to determine a measure related to a pressure change rate (e.g., pressure rise or pressure decay rate, or other measure) in intermediate volume 19 during each VPS test performed as part of at least some of the operational cycles of the combustion appliance, or at other times. Alternatively, or in addition, valve controller 26 may be in communication with one or more inlet pressure sensor 42, outlet pressure sensor 43 or other pressure sensors (e.g., differential pressure sensor 38 and/or other sensors), where pressure sensors 38, 42, 43 sense measures related to the pressure upstream of a first port 20a and downstream of a second port 20b, respectively, and communicate the sensed measures to valve controller 26. Although pressure sensors downstream of the ports (e.g., pressure sensor(s) 43) may not be directly used to determine whether a valve is leaking, the downstream pressure sensor(s) 43 may continuously monitor outlet pressure during leakage tests of the valves and, in some cases, may facilitate determining which valve is leaking if a valve leakage is detected.

In some cases, utilizing an inlet pressure sensor 42 in addition to or as an alternative to pressure sensor 44 may allow controller 26 to determine in real time which valve port 20 is leaking. By using pressure sensor 42 at the inlet, the inlet pressure may be known prior to a VPS sequence and controller 26 may be able to pre-determine thresholds for pressure rise and decay based on knowing the inlet pressure prior to the VPS sequence. Such pre-determination of the thresholds may allow sensed pressures to be compared to the thresholds at any time during the VPS sequence.

Valve controller 26 may include non-volatile memory 37 or other memory that may include a first VPS threshold value (e.g., for comparing to a pressure rise) and a second VPS threshold value (e.g., for comparing to a pressure decay) utilized in performing the VPS test. Alternatively, or in addition, the memory may be located at a position other than in valve controller 26, such that any remote memory may be in communication with valve controller 26. Valve controller 26 may further be configured to compare the determined measure related to a pressure change rate in the intermediate volume 19 to the first and/or second threshold value during a first valve leakage test having a first duration, and/or comparing the measure that is related to a pressure change rate in the intermediate volume 19 to the third and/or fourth threshold value during a second valve leakage test having a second duration that is longer than the first duration. Illustratively, the first and/or second threshold values may be utilized in a valve leakage test each time a combustion appliance or other device connected to valve assembly 10 opens one or more valve ports 20, for example, in a VPS test or other test. The third and/or fourth threshold values may be utilized in a valve leakage test or other test performed as scheduled maintenance while valve assembly 10 is offline, at the time of commissioning of valve assembly 10, and/or at other preferred times.

The VPS test may be achieved by commanding valve actuators 30 to open and/or closed in a useful sequence. This sequence may be initialized and/or controlled through valve controller 26 and/or through the combustion appliance controller 60. When the VPS sequence is initialized and controlled remotely (e.g., remote from valve controller 26) through the combustion appliance controller 60, the valve controller 26 may be configured to detect if the VPS test or another test is occurring by monitoring gas valve assembly 10 and signals communicated to valve assembly 10. If the VPS test is to be controlled by the valve controller 26, the set up of the VPS settings may occur at a display/user interface 76 on board the valve itself or at a remote display (e.g., displays 52, 62). If the VPS test is to be actuated or initiated at or through combustion appliance controller 60, the set up of the VPS settings may occur at a remote display (e.g., displays 52, 62). Valve controller 26 may monitor valve actuators 30a, 30b, first control signal (MV1) controlling first valve actuator 30a and second control signal (MV2) controlling second valve actuator 30b, and/or the states of valve ports 20a, 20b (e.g., by monitoring the output of position sensor(s) 48) to identify if the VPS test is occurring. First and second control signals (MV1 and MV2) may be actuated by a combustion appliance controller 60 in communication with valve assembly 10 or by a valve controller 26 or by a field tool in communication with valve controller 26 or any other tool or individual in communication with valve assembly 10. Although the field tool and other tools are most often used for actuating first and second control signals (MV1 and MV2) in a valve leakage test, such similar or different tools may be used to operate a VPS test or for system level diagnostics and/or troubleshooting by a trained appliance technician in the field.

In performing a VPS test, valve controller 26 may cause or identify the following first predetermined sequence. The first valve actuator 30*a* may close the first valve port 20*a* (if not already closed). The second valve actuator 30*b* may then open the second valve port 20*b* (if not already opened) to depressurize the intermediate volume 19 between the first valve port 20*a* and the second valve port 20*b*. The second valve actuator 30*b* may then close the second valve port 20*b* to seal the depressurized intermediate volume 19.

Valve controller 26 may cause or identify this first predetermined sequence as a first sub-test of a VPS test, and valve controller 26 may be configured to compare a measure that is related to the pressure change rate in intermediate volume 19 to a first VPS sub-test threshold value prior to, during, or after a first sub-set VPS duration. After or while comparing the measure related to the pressure change rate in intermediate volume 19 to the first sub-test threshold value, valve controller 26 may output a signal if the measure meets and/or exceeds the first sub-test threshold value. Valve controller 26 may be configured to output the signal over the communication bus 100 or using a simple pair of contacts (e.g., relay contacts that close when a measured pressure surpasses a threshold pressure value) at or in communication with appliance controller 60, one or more of a local display, a remote device 50, 60 and/or a remote display 52, 62 of the remote device(s) 50, 60. The first sub-test of the VPS test may be configured to at least detect a leaking first valve port 20*a*. The outputted signal may indicate, or may cause to be indicated, a valve leakage within valve assembly 10 and/or a measure of the magnitude of the valve leakage.

In addition to identifying the first sub-test of a VPS test, valve controller 26 may cause or identify the following second predetermined sequence. The second valve actuator 30*b* may close the second valve port 20*b* (if not already closed). The first valve actuator 30*a* may then open the first valve port 20*a* (if not already opened) to pressurize the intermediate volume 19 between the first valve port 20*a* and the second valve port 20*b*. The first valve actuator 30*a* may then close the first valve port 20*a* to seal the pressurized intermediate volume 19.

Valve controller 26 may cause or identify this second predetermined sequence as a second sub-test of a VPS test, and valve controller 26 may be configured to compare a measure that is related to the pressure change rate in intermediate volume 19 to a second VPS sub-test threshold value prior to, during, or after a second sub-set VPS duration. After or while comparing the measure related to the pressure change rate in intermediate volume 19 to the second sub-test threshold value, valve controller 26 may output a signal if the measure meets and/or exceeds the second sub-test threshold value. Valve controller 26 may be configured to output the signal to one or more of a local display, a remote device 50, 60 and/or a remote display 52, 62 of the remote device(s) 50, 60. The second sub-test of the VPS test may be configured to at least detect a leaking second valve port 20*b*. The outputted signal may indicate, or may cause to be indicated, a valve leakage within valve assembly 10 and/or a measure of the magnitude of the valve leakage. Further, first VPS sub-test and second VPS sub-test of the VPS test may be performed in any order, as desired.

The first and second VPS sub-test threshold values may be programmed into valve controller 26, and the first and second VPS sub-test threshold values may be different or substantially the same value. Alternatively, or in addition, valve controller 26 may be configured to calculate the first and second VPS sub-test threshold values based on one or more parameters and, in some instances, the valve controller 26 may be configured to store the first and second VPS sub-test threshold values. The one or more parameters that valve controller 26 may consider if it is determining a VPS sub-test threshold value include, but are not limited to, a sensed pressure, a sensed temperature, max flow rate of the system, a number of ON-OFF cycles operated up to a point in time, volume of flow channel 18, altitude of valve assembly 10, barometric pressure, absolute pressure, gas type (e.g., density), ANSI requirements, EN requirements, other agency requirements, an allowed VPS test duration, and how small of a leak is to be detected, etc. Further, in the event more than two sub-tests are performed as part of the VPS test, there may be more threshold values than the first and second VPS sub-test threshold values, if desired.

In an illustrative operation, a VPS test may be performed on a valve assembly 10 that is coupled to a non-switched gas source, or other gas source, that is under a positive pressure during the VPS test to test gas valve assembly 10 for leaks.

A similar VPS test performed on valve assembly 10 may include opening one of the first and second valve port 20*a*, 20*b* with the other of the first and second valve ports 20*a*, 20*b* remaining or being closed. After opening one of the first and second valve ports 20*a*, 20*b*, closing the opened valve port such that both valve ports 20*a*, 20*b* are closed such that a first initial gas pressure may be present in intermediate volume 19. An intermediate pressure sensor 44 may continuously or discontinuously sense a pressure in intermediate volume 19, including the first initial pressure therein, and send the sensed pressures to valve controller 26. The initial pressure in intermediate volume 19 may be sensed at any time, for example, the initial pressure may be sensed after opening one of the valve ports 20*a*, 20*b* and before closing that opened valve port 20*a*, 20*b*. Valve controller 26 may monitor (e.g., continuously or discontinuously), over time, the pressure in intermediate volume 19 and determine a first measure that is related to a pressure change rate within intermediate volume 19 while both valve ports 20*a*, 20*b* are in a closed position. After determining the first measure that is related to a pressure change rate within intermediate volume 19, valve controller 26 may compare the determined first measure related to a pressure change rate in the intermediate volume 19 to a first threshold value stored in valve controller 26. Valve controller 26 may then output to a display and/or remote device 50, 60 or other device an output signal that is related to the first measure related to the pressure change rate (e.g., a determined pressure change in intermediate volume 19, or other determined measure), where outputting the output signal may also include storing the determined first measure related to the pressure change rate in non-volatile memory 37 on valve controller 26. Optionally, valve controller 26 may output the output signal if the determined first measure meets and/or exceeds the first threshold value. The output signal, however, may convey any information, as desired. For example, the output signal may convey information related to when (e.g. time stamp) the determined measure that is related to the pressure change rate meets and/or exceeds a threshold value, or other information related to or not related to the pressure in intermediate volume 19. In an alternative, or in addition to providing the output signal, a visual and/or audible indicator may be provided to indicate if valve assembly 10 passed or failed the VPS test.

In addition, first and/or second valve port 20a, 20b may be manipulated such that a second initial gas pressure may be present in the intermediate volume 19 while the first and second valve ports 20a, 20b are in the closed position. For example, second valve port 20b may be closed, then the first valve port 20a may be opened to pressurize intermediate volume 19 and then closed to seal in the second initial pressure. The second initial pressure may be substantially different than the first initial gas pressure, as the first initial pressure may be associated with a depressurized state of intermediate volume 19 and the second initial pressure may be associated with a pressurized state of intermediate volume 19, for example. Similar to above, intermediate pressure sensor 44 may sense pressure within intermediate volume 19 and communicate the sensed pressure and measures related to the sensed pressures to valve controller 26. Valve controller 26 may monitor (e.g., continuously or discontinuously), over time, the pressure in intermediate volume 19 and determine a second measure that is related to a pressure change rate within intermediate volume 19 while both valve ports 20a, 20b are in the closed position. After determining the second measure that is related to a pressure change rate within intermediate volume 19, valve controller 26 may compare the determined second measure related to a pressure change rate in the intermediate volume 19 to a second threshold value stored in valve controller 26. Valve controller 26 may then output to a display and/or remote device 50, 60 or other device an output signal that is related to the second measure related to a pressure change rate, where outputting the output signal may also include storing the determined second measure related to the pressure change rate in non-volatile memory 37 on valve controller 26. Optionally, valve controller 26 may output the output signal or a different output signal if the determined second measure meets and/or exceeds the second threshold value. The output signal, however, may convey any information and the outputted signals may be outputted in any situation. Further, the output signal may be configured to provide, or cause to be provided, a visual and/or audible indicator to indicate if valve assembly 10 passed and/or failed the VPS test.

The steps of the illustrative VPS test may be performed once such as when the gas valve assembly 10 is installed or during routine maintenance, and/or the steps may be repeated during each combustion cycle of a combustion appliance. In either case, the valve controller 26 or other device, or even a user, may identify a trend in the stored determined measures related to the pressure change rate or in other data sensed, calculated and/or stored during the valve leakage tests. A determined trend may be used for any of many purposes, for example, a trend may be used to predict when the valve will require replacement and/or servicing, and/or to make other predictions. Further, a VPS test and/or leakage test may be initiated and/or operated dependent on or independent of an attached device (e.g., a combustion appliance controller 60). In such an instance, valve controller 26 may be configured to initiate and operate a VPS test and/or leakage test independent of an attached device and may be configured to disable a heat call or other signal to and/or from an attached device, when appropriate.
Valve Leakage Test (VLT)

Valve controller 26 may be configured to perform a Valve Leakage (VL) Test on valve assembly 10. Valve controller 26 may be manually initialized by a field service technician or other user at either a local display on the valve assembly 10 (e.g., when valve controller 26 controls the operation of the VL test) or at a remote display 52, 62 (e.g., when either the valve controller 26 controls the operation of the VL test or when the VL test is remotely controlled). Similar to the set up for a VPS test, the structural set up of valve assembly 10 for a VL test may include valve controller 26 in communication with a pressure sensor 44 that may be in fluid communication with intermediate volume 19 between two valve ports 20 (e.g., first valve port 20a and second valve port 20b), as seen in FIG. 8. Where valve controller 26 is in communication with pressure sensor 44, valve controller 26 may be configured to determine a measure related to a pressure change rate (e.g., pressure rise or decay rate, or other measure) in intermediate volume 19 when both the first valve port 20a and second valve port 20b are closed.

The VL test may be performed in the same manner as the VPS test discussed above. However, in the VL test, the test duration may be longer (e.g., one minute, two minutes, several minutes, or other time period that may possibly be longer than a typical length of time it may take to run a VPS test) during which time a combustion appliance may be offline, thereby allowing smaller leaks to be detected. Also, the thresholds values used during the VL test may be different from those used in the VPS test. Also, the VL test may be performed less frequently than the VPS test. For example, the VL test may be performed once a year or during routine maintenance, and not during every combustion cycle.

In some cases, valve controller 26 may be configured to initiate a VL test. In some instances, the valve controller 26 may be configured to detect if a VPS test or a longer, Valve Leakage (VL) test, is occurring by monitoring gas valve assembly 10 and signals communicated to valve assembly 10. For example, valve controller 26 may monitor valve actuators 30a, 30b, first control signal (MV1) controlling first valve actuator 30a and/or second control signal (MV2) controlling second valve actuator 30b, and/or the states of valve ports 20a, 20b to identify if a VPS test or a longer VL test is occurring. In some cases, first and second control signals (MV1 and MV2) may be controlled by a combustions appliance in communication with valve assembly 10 or a field tool in communication with valve assembly 10 or any other tool or individual in communication with valve assembly 10. If a VL test is detected, valve controller 26 may automatically apply thresholds associated with the longer VL test rather than thresholds of the shorter VPS test. The valve controller 26 may revert back, automatically or otherwise, to using VPS thresholds after the longer VL test has been completed, if desired.

When valve assembly 10 may be disconnected from a combustion appliance controller 60 and connected to a field tool to effect the VL test with VL thresholds, it is contemplated that when combustion appliance controller 60 is reconnected with valve assembly 10, previous combustion appliance-valve assembly thresholds/conditions (e.g., VPS thresholds) may be automatically reset, as valve controller 26 and device controller 60 may automatically detect the reconnection.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A valve assembly for controlling fuel flow to a combustion appliance, the valve assembly comprising:
   a valve body having an inlet port and an outlet port, with a fluid path extending between the inlet port and the outlet port;
   a first valve situated in the fluid path between the inlet port and the outlet port;
   a second valve situated in the fluid path between the inlet port and the outlet port downstream of the first valve, with an intermediate volume between the first valve and the second valve defined by the valve body;
   a first valve actuator, secured relative to the valve body, for selectively moving the first valve between a closed position, which closes the fluid path between the inlet port and the outlet port, and an open position;
   a second valve actuator, secured relative to the valve body, for selectively moving the second valve between a closed position, which closes the fluid path between the inlet port and the outlet port, and an open position;
   a first pressure sensor positioned upstream of the first valve, the first pressure sensor sensing a pressure in the valve body upstream of the first valve and providing a first measure, which at least tracks the sensed pressure in the valve body upstream of the first valve;
   a second pressure sensor positioned downstream of the second valve, the second pressure sensor sensing a pressure in the valve body downstream of the second valve and providing a second measure, which at least tracks the sensed pressure in the valve body downstream of the second valve; and
   a controller in communication with the first pressure sensor and the second pressure sensor, the controller configured to:
      compare the first measure, which at least tracks the sensed pressure in the valve body upstream of the first valve, with a first pressure threshold, and if the first measure goes beyond the first pressure threshold, the controller provides a predetermined first output signal, causes the first valve actuator to close the first valve, and causes the second valve actuator to close the second valve;
      compare the second measure, which at least tracks the sensed pressure in the valve body downstream of the second valve, with a second pressure threshold that is different from the first pressure threshold, and if the second measure goes beyond the second pressure threshold, the controller provides a predetermined second output signal, causes the first valve actuator to close the first valve, and causes the second valve actuator to close the second valve; and
      compare the first measure with a third pressure threshold that is different from the first pressure threshold, and to provide a predetermined output signal if the first measure goes beyond the third pressure threshold.

2. The valve assembly of claim 1, wherein the first threshold relates to a low gas pressure threshold, and the second threshold relates to a high gas pressure threshold.

3. The valve assembly of claim 1, wherein the controller includes a non-volatile memory, and the controller is configured to store data related to the first measure in the non-volatile memory.

4. The valve assembly of claim 1, wherein the controller is physically secured to the valve body.

5. The valve assembly of claim 1, wherein the controller does not provide the predetermined first output signal during at least one time period, even if the first measure goes beyond the first pressure threshold.

6. The valve assembly of claim 5, wherein the at least one time period is associated with a status of the first valve actuator and/or the second valve actuator.

7. The valve assembly of claim 1, wherein the controller includes an I/O interface for communicating with a remote device that is located remotely from the valve assembly.

8. The valve assembly of claim 7, wherein the I/O interface includes a wired and/or wireless interface.

9. A method of monitoring for the occurrence of pressure events in a valve that is configured to control fuel flow to a combustion appliance, the valve having a valve body with an inlet port and an outlet port, and at least one movable valve member situated between the inlet port and outlet port, the method comprising:
   sensing an inlet pressure in the valve body upstream of the at least one movable valve member with a first pressure sensor integrated with the valve body and communicating with a controller and sensing an outlet pressure in the valve body downstream of the at least one movable valve member with a second pressure sensor integrated with the valve body and communicating with the controller;
   comparing a measure that tracks the inlet pressure to a first pressure threshold, comparing a measure that tracks the outlet pressure to a second pressure threshold, and comparing the measure that tracks the inlet pressure to a third pressure threshold, wherein the first pressure threshold is different from the second pressure threshold and the first pressure threshold is different than the third pressure threshold, and if the inlet pressure goes beyond the first pressure threshold, the outlet pressure goes beyond the second pressure threshold, and/or the inlet pressure goes beyond the third pressure threshold, providing a signal that indicates a pressure event has occurred and closing at least one of the movable valve members.

10. A valve assembly for controlling fuel flow to a combustion appliance, the valve assembly comprising:
    a valve body having an inlet port and an outlet port, with a fluid path extending between the inlet port and the outlet port;
    a first valve situated in the fluid path between the inlet port and the outlet port;
    a second valve situated in the fluid path between the inlet port and the outlet port downstream of the first valve, with an intermediate volume between the first valve and the second valve defined by the valve body;
    a first valve actuator, secured relative to the valve body, for selectively moving the first valve between a closed position, which closes the fluid path between the inlet port and the outlet port, and an open position;
    a second valve actuator, secured relative to the valve body, for selectively moving the second valve between a closed position, which closes the fluid path between the inlet port and the outlet port, and an open position;
    a plurality of microelectromechanical systems (MEMS) pressure sensors at least one of which is positioned downstream of the first valve and upstream of the second valve, each of the plurality of MEMS pressure sensors sensing a corresponding pressure in the valve body, each MEMS pressure sensor providing a valid sensor output over a valid pressure range, wherein the valid pressure range of at least one of the plurality of MEMS pressure sensors is different from the valid pressure range of another one of the plurality of MEMS pressure sensors; and a controller in communication with the plurality of MEMS pressure sensors, the controller configured to track the sensed pressure in the intermediate volume using the valid sensor output signal of the at least one MEMS pressure sensor positioned downstream of the first valve and upstream of the second valve, and to compare a measure related to the sense pressure in the intermediate volume with a first threshold, and if the measure goes beyond the first threshold, provide a predetermined output signal and cause the first valve actuator to close the first valve and cause the second valve actuator to close the second valve.

* * * * *